United States Patent
Mohan et al.

(10) Patent No.: US 8,826,118 B2
(45) Date of Patent: Sep. 2, 2014

(54) APPLICATIONS AND SERVICES SUPPORTED BY A CLIENT-SERVER INDEPENDENT INTERMEDIARY MECHANISM

(75) Inventors: Sudhir Mohan, Santa Clara, CA (US); Umesh R. Patil, San Jose, CA (US); Daniel S. Jordan, San Francisco, CA (US)

(73) Assignee: F5 Networks, Inc., Seattle, WA (US)

( * ) Notice: Subject to any disclaimer, the term of this patent is extended or adjusted under 35 U.S.C. 154(b) by 199 days.

(21) Appl. No.: 10/305,754

(22) Filed: Nov. 26, 2002

(65) Prior Publication Data

US 2003/0140312 A1  Jul. 24, 2003

Related U.S. Application Data

(62) Division of application No. 09/312,255, filed on May 14, 1999, now abandoned.

(51) Int. Cl.
*G06F 17/00* (2006.01)
*G06F 17/22* (2006.01)
*G06F 17/30* (2006.01)
*H04L 29/08* (2006.01)

(52) U.S. Cl.
CPC ........ *G06F 17/2247* (2013.01); *G06F 17/3089* (2013.01); *H04L 67/02* (2013.01); *H04L 67/06* (2013.01); *H04L 69/329* (2013.01); *Y10S 707/99933* (2013.01); *Y10S 707/9994* (2013.01)
USPC ........... 715/234; 709/203; 709/217; 709/218; 709/219; 709/225; 709/229; 707/999.01; 707/999.003

(58) Field of Classification Search
CPC ......... H04L 67/02; H04L 67/22; H04L 67/28; H04L 67/42; H04L 67/142; H04L 67/1002; H04L 67/1095; H04L 67/2819; H04L 67/2842; H04L 69/329; H04L 29/06; H04L 29/16; H04L 63/0281; G06Q 30/02; G06Q 10/10; G06F 17/30899; G06F 17/30902
USPC ......... 715/507, 513, 223, 234, 742, 745, 205, 715/738, 760; 709/217–219, 226–227, 203, 709/225, 229; 719/311, 331; 705/26, 1, 14, 705/74; 718/105; 707/999.01, 999.003, 707/E17.108, 999.005, 999.109
See application file for complete search history.

(56) References Cited

U.S. PATENT DOCUMENTS 5,341,293 A  *  8/1994  Vertelney et al. ............. 715/530
5,586,260 A  *  12/1996  Hu .................................. 726/12
(Continued)

FOREIGN PATENT DOCUMENTS

| JP | 10187525 | 5/1997 |
|---|---|---|
| WO | WO 98/26344 | 6/1998 |
| WO | WO 00/65773 | 11/2000 |

OTHER PUBLICATIONS

LBD,"Public Application Server; I3: Proxy Cookies", date unknown, downloaded from <http://lbdpc15.epfl.ch/I3/i3-proxy-cookies.php> 4 pages.*

(Continued)

*Primary Examiner* — Chau Nguyen
*Assistant Examiner* — James H Blackwell
(74) *Attorney, Agent, or Firm* — John W. Branch; Lowe Graham Jones PLLC

(57) ABSTRACT

A method and apparatus of accessing data through an independent intermediary mechanism (IIM) is described. The method includes displaying a frame including a user interface of the IIM, the frame framing a destination server display area (DSDA). The method further includes having one or more of the following functions provided by the IIM: a home page, a history list, bookmarks, a one-click account log-in function, a transaction record accessible to the user, a forms database permitting new forms to be added to the forms database, a user profile, and automatic form-fill function based on the forms database and the user profile.

16 Claims, 25 Drawing Sheets

(56) References Cited

U.S. PATENT DOCUMENTS

| | | | |
|---|---|---|---|
| 5,673,322 A | 9/1997 | Pepe et al. | |
| 5,684,950 A * | 11/1997 | Dare et al. | 726/10 |
| 5,754,830 A * | 5/1998 | Butts et al. | 719/311 |
| 5,774,670 A * | 6/1998 | Montulli | 709/227 |
| 5,794,259 A | 8/1998 | Kikinis | |
| 5,870,769 A * | 2/1999 | Freund | 715/501.1 |
| 5,875,296 A * | 2/1999 | Shi et al. | 726/5 |
| 5,892,828 A * | 4/1999 | Perlman | 713/183 |
| 5,925,126 A * | 7/1999 | Hsieh | 726/19 |
| 5,928,363 A * | 7/1999 | Ruvolo | 726/22 |
| 5,930,810 A | 7/1999 | Farros et al. | |
| 5,933,503 A * | 8/1999 | Schell et al. | 713/189 |
| 5,944,824 A * | 8/1999 | He | 726/6 |
| 5,960,411 A | 9/1999 | Hartman et al. | |
| 5,961,593 A * | 10/1999 | Gabber et al. | 709/219 |
| 5,963,964 A | 10/1999 | Nielsen | |
| 5,974,430 A | 10/1999 | Mutschler | |
| 5,983,268 A | 11/1999 | Freivald et al. | |
| 5,991,810 A * | 11/1999 | Shapiro et al. | 709/229 |
| 5,995,624 A * | 11/1999 | Fielder et al. | 713/169 |
| 6,012,083 A * | 1/2000 | Savitzky et al. | 709/202 |
| 6,018,619 A * | 1/2000 | Allard et al. | 709/224 |
| 6,029,195 A * | 2/2000 | Herz | 725/116 |
| 6,049,821 A * | 4/2000 | Theriault et al. | 709/203 |
| 6,049,877 A * | 4/2000 | White | 726/5 |
| 6,073,140 A | 6/2000 | Morgan et al. | |
| 6,076,108 A * | 6/2000 | Courts et al. | 709/227 |
| 6,081,837 A * | 6/2000 | Stedman et al. | 709/219 |
| 6,085,030 A * | 7/2000 | Whitehead et al. | 709/203 |
| 6,085,239 A | 7/2000 | Kubo et al. | |
| 6,125,457 A * | 9/2000 | Crisan et al. | 714/36 |
| 6,128,279 A * | 10/2000 | O'Neil et al. | 370/229 |
| 6,131,116 A | 10/2000 | Riggins et al. | |
| 6,134,592 A * | 10/2000 | Montulli | 709/229 |
| 6,138,150 A * | 10/2000 | Nichols et al. | 709/219 |
| 6,148,331 A * | 11/2000 | Parry | 709/218 |
| 6,157,953 A * | 12/2000 | Chang et al. | 709/225 |
| 6,158,010 A * | 12/2000 | Moriconi et al. | 726/1 |
| 6,178,511 B1 * | 1/2001 | Cohen et al. | 726/6 |
| 6,192,380 B1 | 2/2001 | Light et al. | |
| 6,219,700 B1 * | 4/2001 | Chang et al. | 709/222 |
| 6,240,512 B1 * | 5/2001 | Fang et al. | 713/150 |
| 6,243,816 B1 * | 6/2001 | Fang et al. | 726/5 |
| 6,256,737 B1 * | 7/2001 | Bianco et al. | 713/186 |
| 6,275,944 B1 * | 8/2001 | Kao et al. | 726/36 |
| 6,308,203 B1 * | 10/2001 | Itabashi et al. | 709/217 |
| 6,327,659 B2 * | 12/2001 | Boroditsky et al. | 713/182 |
| 6,345,300 B1 * | 2/2002 | Bakshi et al. | 709/229 |
| 6,353,822 B1 | 3/2002 | Lieberman | |
| 6,374,359 B1 * | 4/2002 | Shrader et al. | 726/5 |
| 6,377,991 B1 * | 4/2002 | Smith et al. | 709/226 |
| 6,381,654 B1 * | 4/2002 | Brawn et al. | 719/331 |
| 6,397,253 B1 * | 5/2002 | Quinlan et al. | 709/227 |
| 6,421,693 B1 * | 7/2002 | Nishiyama et al. | 715/507 |
| 6,490,601 B1 * | 12/2002 | Markus et al. | 715/507 |
| 6,490,602 B1 * | 12/2002 | Kraemer | 715/236 |
| 6,496,824 B1 * | 12/2002 | Wilf | 707/10 |
| 6,560,640 B2 * | 5/2003 | Smethers | 709/219 |
| 6,591,279 B1 * | 7/2003 | Emens et al. | 707/201 |
| 6,606,663 B1 * | 8/2003 | Liao et al. | 709/229 |
| 6,751,654 B2 * | 6/2004 | Massarani et al. | 709/219 |
| 6,757,869 B1 * | 6/2004 | Li et al. | 715/513 |
| 6,874,120 B2 * | 3/2005 | Le et al. | 715/507 |
| 6,910,180 B1 * | 6/2005 | Cui et al. | 715/513 |
| 6,968,571 B2 * | 11/2005 | Devine et al. | 726/11 |
| 7,200,578 B2 * | 4/2007 | Paltenghe et al. | 705/74 |
| 2001/0011250 A1 * | 8/2001 | Paltenghe et al. | 705/41 |
| 2001/0020242 A1 * | 9/2001 | Gupta et al. | 707/501.1 |
| 2001/0028364 A1 * | 10/2001 | Fredell et al. | 345/751 |
| 2001/0032254 A1 * | 10/2001 | Hawkins | 709/219 |
| 2001/0039587 A1 * | 11/2001 | Uhler et al. | 709/229 |
| 2001/0054155 A1 * | 12/2001 | Hagan et al. | 713/193 |
| 2002/0007317 A1 * | 1/2002 | Callaghan et al. | 705/26 |
| 2002/0007374 A1 * | 1/2002 | Marks et al. | 707/513 |
| 2002/0007460 A1 * | 1/2002 | Azuma | 713/201 |
| 2002/0010776 A1 * | 1/2002 | Lerner | 709/225 |
| 2002/0029269 A1 * | 3/2002 | McCarty et al. | 709/225 |
| 2003/0158889 A1 * | 8/2003 | Massarani et al. | 709/203 |
| 2004/0123144 A1 * | 6/2004 | Chan et al. | 713/201 |
| 2004/0250118 A1 * | 12/2004 | Andreev et al. | 713/201 |
| 2005/0256923 A1 * | 11/2005 | Adachi | 709/203 |

OTHER PUBLICATIONS

Kristol et al.,"RFC 2109—HTTP State Management Mechanism", Feb. 1997, RFC Archives, 17 pages.*

Kristol,"HTTP Proxy State Management Mechanism", May 26, 1998, HTTP Working Group, 9 pages.*

Unknown author,"I3: Proxy Cookies", downloaded Jun. 5, 2006 http://lbdpc15.epfl.ch/I3/i3-proxy-cookies.php.*

Keller et al.,"A Bookmarking Service for Organizing and Sharing URLs", Apr. 1997, Proc. 6th WWW Conf., Santa Clara CA, 14 pages.*

Rao, H.C.H et al.,"A Proxy-Based Personal Portal," in Proc. of WebNet World Conf. on the WWW and Internet 1999, pp. 913-918.*

"A Bookmarking Service for Organizing and Sharing URL's", R. Keller, S. Wolfe, J. Chen, J. Rabinowitz, N. Mathe, White Paper, Computer Networks and ISDN Systems Issue 29, pp. 1104-1114, 1997.

"WWW Assisted Browsing by Reusing Past Navigations of a Group of Users", M. Jaczynski and B. Trousse, Advances in Case-Based Reasoning, DE, Springer Verlag, Sep. 1998, pp. 160-171.

"Broadway, A Case-Based Browsing Advisor for the Web", M. Jaczynski and B. Trousse, Advances in case-based reasoning, DE, Springer Verlag, Sep. 1998, pp. 692-698.

"Intermediaries: New Places for Producing and Manipulating Web Content", R. Barrett and P. Maglio, Computer Networks and ISDN Systems Issue 30, pp. 509-518, 1998.

"Roaming Access Now Available", Apr. 21, 1999, Computing News, www.cns.yorku.ca/archive/compNews/Articles/9904/roam.htm.

Netscape: "Flexible Roaming Access" White Paper, www.home.netscape.com/communicator/v4.5/whitepaper/roaming.html, Jan. 17, 2001.

Reardon, M.; "A Smarter Session Switch: Arrowpoint's CS Session Switches Boast the Brains Needed for E-Commerce," Data Communications on the Web (www.data.com); Jan. 1999, Title Page, pp. 3, 5, 18.

Hewitt, John R. et al.; "Securities Practice and Electronic Technology"; Corporate Securities Series (New York: Law Jounral Seminars-Press); 1998; Title Page, Bibliography Page, pp. 4-29 and 4-30.

* cited by examiner

| Original Code | Altered Code | Comments |
|---|---|---|
| HTML | | |
| `<base href="anyURL">` | `<base href="http://www.DS.com/myDocument.html">`<br>`base href="anyURL">` | www.DS.com is the hostname of the DS. The IIM inserts the first `<base>` tag line after the `<HTML>` tag and before the `<HEAD>` tag, and before any existing `<base>` tags |
| `<form action="/actionURL">` | `SaveOrigAction( form, actionURL)`<br>`<form action="http://www.IIM.com/redirect?act=http://www.DS.com/actionURL">` | www.IIM.com is the hostname of the IIM and www.DS.com is the hostname of the DS. SaveOrigAction() is a Javascript function that saves the form's original action. |
| `<applet codebase="/codebase" code="applet.class">` | `<applet codebase="http://www.IIM.com/redirect?cb=http://www.DS.com/codebase" code="applet.class">` | www.IIM.com is the hostname of the IIM and www.DS.com is the hostname of the DS. |
| `<frame src="/myFrame.html">`<br>other tags e.g., `<script>`, `<area>`, `<layer>`, `<img>` | `<frame src="http://www.IIM.com/redirect?src=http://www.DS.com/myFrame.html">` | www.IIM.com isd the hostname of the IIM and www.DS.com is the hostname of the DS. |
| Javascript | | |
| `link.href ="newLocation"` | `setURLProperty ( link, "href", "newLocation" )` | setURLProperty() sets the value of the property href to the value "http://www.IIM.com/redirect?url=http://www.DS.com/newLocation", where www.IIM.com is the hostname of the IIM and www.DS.com is the hostname of the DS. |
| `link.onclick = originalOnClick` | `function addNewLinkOnclick(link){`<br>`  link.onclickOrig =`<br>`    link.onclick;`<br>`  link.onclick =`<br>`    newLinkOnclick; }`<br><br>`function newLinkOnclick(link){`<br>`  if ( link.originalHref == null )`<br>`    link.originalHref = link.href;`<br>`  var newHref =`<br>`    getFullPathName(`<br>`      link.originalHref );`<br>`  link.href =`<br>`    http://www.IIM.com/redirect?url=newHref;`<br>`  return link.onclickOrig(); }` | getFullPathName() retruns the full pathname URL of the HTML and www.IIM.com is the hostname of the IIM. The function addNewLinkOnclick() is called when the HTML document is first loaded |

FIG. 16A

| Original Code | Altered Code | Comments |
|---|---|---|
| document.write(StringToWrite) | writeDocument( document, StringToWrite ); | writeDocument() recursively modifies all HTTP control points that occur in StringToWrite |
| window.open( newLocation ); | openWindow ( window, newLocation ); | openWindow calls windows.open() with the argument "http://www.IS.com/redirect?url=http://www.DS.com/newLocation |
| form.onsubmit = originalOnSubmit | function addNewFormOnsubmit(form){ form.onsubmitOrig = form.onsubmit; form.onsubmit = newFormOnsubmit; } function newFormOnsubmit ( form ) { if (form.originalAction == null) {form.originalAction = form.action;} var newAction = getFullPathName(form.original Action); form.action = http://www.IIM.com/redirect?url =newAction; return form.onsubmitOrig(); } | getFullPathName() returns the full pathname URL of the HTML document and www.IIM.com is the hostname of the IIM. The function addNewFormOnsubmit() is called when the HTML document is first loaded |
| Java | | |
| class.java.net.Socket | Extends java.net.Socket and overrides various constructors. | The extended method modifies the host and port arguments. The modified host argument is the hostname of the IIM. the modified port argument is the port of the IIM |
| java.applet.AppletContext | Extends java.applet.AppletContext and overrides various constructors | The extended method modifies the url argument. The modified url sends the HTTP request to the IIM with the full pathname of the original url as a query parameter |
| class java.applet.Applet | Extends java.applet.Applet and overrides various constructors | The extended method modifies the url argument. The modified url sends the HTTP request to the IIM with the full pathname of the original url as query parameter |

FIG. 16B

| Original Code | Altered Code | Comments |
|---|---|---|
| HTTP Headers | | |
| referer, e.g. value = origDoc.htm | referer, http://www.IIS.com/origDoc.htm | referer value is replaced with the full pathname of the document's original URL |
| content-type, value = null | content-type, e.g. value = image/gif | If the value of the content-type is null, the IIM sets this header to a value that describes the type of content contained in the document |
| refresh, e.g. 500; origDoc.htm | 500; http://www.IIS.com/redirect?ref=http://www.IIS.com/origDoc.htm | IIM replaces the URL portion of the value of the refresh header with the full pathname of the document's original URL |
| 301, 302 status codes, e.g. URI value = http://www.IIS.com/origDoc.html | 301, 302 status codes, URI value = http://www.IIS.com/redirect?uri=http://www.IIS.com/origDoc.html | www.IIM.com is the hostname of the IIM |
| 201, 303, 305, 307 status codes | 201, 303, 305, 307 status codes | See 301, 302 status codes |
| URI values | modified URI values | |

FIG. 16C

| Original Code | Altered Code | Comments |
|---|---|---|
| HTML | | |
| target = "_top"<br><br>for <a href>, <frame>, <form> and <base> tags | target = "DSFrameName" | where DSFrameName is the name of the DSDA top frame. |
| target = "_parent"<br><br>for <a href>, <frame>, <form> and <base> tags | target = "DSFrameName" | where DSFrameName is the name of the DSDA top frame, if the current window evaluates to the DSDA top frame. |
| Javascript | | |
| top.locationProperty = value | setTopProperty ( currentWindow, locationProperty, value ) | setTopProperty sets a location property on the DSDA top frame with name locationProperty to have value value |
| window.parent.locationProperty = value | setTopProperty ( window.parent, locationProperty, value ) | setTopProperty sets a location property on the DSDA top frame with name locationProperty to have value value if window.parent evaluates to the top or IIM frame |
| Java | | |
| java.applet.AppletContext.showDocument( url, target ) | newShowDocument ( window, url, target )<br>{<br>java.applet.AppletContext.showDocument( url, newTarget )<br>} | newShowDocument calls java.applet.AppletContext.showDocument where newTarget is the name of the DSDA frame if target equals "_top" or if target equals "_parent" and window is the DSDA frame, "newTarget" is set to "target" otherwise |

FIG. 17

| Original Code | Altered Code | Comments |
|---|---|---|
| Javascript | | |
| String = document.cookie | string = getCookie( window, document ) | getCookie() gets the cookie's value from the IIM and assigns the value to string |
| document.cookie = cookieString | setCookie( window, document, cookieString) | setCookie() sends the value of cookieString to the IIM to be managed |
| HTTP Headers | | |
| | cookie | IIM sends this header to the DS on a need basis |
| Java | | |
| javax.servlet.http.Cookie | public class ISCookie implements Serializable {<br><br>private long_creationTime;<br><br>public boolean hasExpired(){<br>// expiration function code }<br>} | maintains the cookie's creation time and contains convenience routines that determine if the cookie has expired |
| Cookies | public class Cookies extends PersistantObject implements Serializable {<br><br>public String getCookie (URL url) {}<br><br>public static Cookie parseCookie(String str) {}<br><br>public void addCookie(ISCookie coo, URL url) {}<br><br>private boolean validCookie(ISCookie coo, URL url) {}<br>} | extends the Java persistent object class, and saves in a user database the user-specific cookie information that the DS sent in the set-cookie header. This class also finds the cookies in the cookie database that are valid for a certain URI based on well known Cookie rules and returns a Cookie string for a given URI. |

FIG. 18

| Original Code | Altered Code | Comments |
|---|---|---|
| Javascript | | |
| window.location = newLocation | setLocation(currentWindow, window, newLocation) | setLocation() sets the window.location to the value "http://www.IIM.com/redirect?url=http://www.DS.com/newLocation", where www.IIM.com is the hostname of the IIM and www.DS.com is the hostname of the DS. |
| saveLocation = window.location | saveLocation = getLocation(currentWindow, window) | where getLocation returns window.location except when window is equal to the top frame, then it returns the DSDA top top frame's location |
| top.userProperty = value | setTopProperty ( currentWindow, userProperty, value ) | where setTopProperty sets a user property on the DSDA top frame with name userProperty to have value value |
| window.parent.userProperty = value | setTopProperty ( window.parent, userProperty, value ) | where setTopProperty sets a user property on the DSDA top frame with name userProperty to have value value if window.parent evaluates to the top frame. |

FIG. 19

APPLICATIONS AND SERVICES SUPPORTED BY A CLIENT-SERVER INDEPENDENT INTERMEDIARY MECHANISM

The present patent application is a divisional of Ser. No. 09/312,255 filed May 14, 1999 now abandoned.

FIELD OF THE INVENTION

The present invention relates to client-server communication, and more specifically, to using an independent intermediary mechanism between a client and a server.

BACKGROUND

The World-Wide Web (WWW, W3, the Web) is an Internet client-server hypertext distributed information retrieval system. An extensive user community has developed on the Web since its introduction.

FIG. 1 is a block diagram of a prior art client-server system. The client A 110 can access destination servers DS1-DS3 150-170. Similarly, other clients B and C, 120 130, can access the destination servers DS1-3 150-170. Each destination server may provide different services, information, or other data to the user.

On the Web everything (documents, menus, indices) is represented to the user as hypertext objects in hypertext markup language (HTML) format, or as Java, or JavaScript objects, or other data types. Hypertext links refer to other documents by their uniform resource identifiers (URIs). The client program, known as a browser, e.g. NCSA Mosaic, Netscape Navigator, runs on the user's computer and provides two basic navigation operations: to follow a link or to send a query to a server. Users access the web through these browsers.

Users often access the web from multiple locations. Users may access the web from their office, at different locations at work, at home, or on the road. Libraries and Internet cafes make web access available on a walk-in basis as well.

A user accesses a server by typing the URI of the server into the browser's address window. The browser then connects to the server corresponding to this URI. Another method of accessing a web site is by selecting the web site from the list of bookmarks. The list of bookmarks is resident in the browser in the user's computer. Thus, if a user wishes to have similar bookmarks on multiple computers, he or she must manually copy the bookmarks and transfer them between the computers. This process is inconvenient.

Furthermore, many servers use cookies to store information about the user. This information may include the user name, password, previous interests, etc. These cookies are also stored in the user's browser. Again, this means that if the user is accessing the Internet from multiple computers, the user's cookies have to be duplicated into multiple computers. This process is inconvenient.

Many users have multiple accounts on different computer systems. For example, a user may have an account with a bank, an e-mail account, a personalized portal site account, and an account on an e-commerce server. Currently, the users must log into each of these accounts by remembering and providing his or her user name and password. For security, each of these user names and passwords should be different. Remembering different names and passwords is inconvenient to the user. Thus, a method for a simple log-in into various accounts from any computer would be advantageous.

Most clients and servers support "forms" which allow the user to enter arbitrary text as well as selecting options from customizable menus and on/off switches. As more business is transacted on the Web, forms are proliferating. The forms may include forms for requesting further information, for ordering items from the Web, for registering for a Web site, etc. However, the user generally can not get a copy of the information filled into the form. The user can either print the page when the form is filled in, generating a paper copy, or rely on the server to respond in a manner that permits the user to make a record of the information entered in to the form. A method of tracking information filled into forms would be advantageous. Furthermore, vendors may respond with an order number or other useful information. The user can keep a copy of this page, which is generally only temporarily available, by printing it, or copying down the information provided. A method of attaching this vendor response to the original order information and making both available to the user would be advantageous.

Furthermore, currently, the user has to fill out each of these forms separately. Generally, the forms request the same types of information, i.e. name, address, telephone number, e-mail address, etc. The user has to enter all of this information for each form. This is repetitious and takes time. Additionally, if such information as credit card number or social security number is requested, the user has to pull out the credit card and copy a long string of numbers. This makes errors likely. Furthermore, the user has to verify that a Web site that requests a credit card number or similar confidential information is of the appropriate level of security for the user to feel comfortable sending the information over the Web. An improved method of filling out forms would be advantageous.

SUMMARY OF THE INVENTION

A method and apparatus of accessing data through an independent intermediary mechanism (IIM) is described. The method includes displaying a frame including a user interface of the IIM, the frame framing a destination server display area (DSDA). The method further includes having one or more of the following functions provided by the IIM: a home page, a history list, bookmarks, a one-click account log-in function, a transaction record accessible to the user, a forms database permitting new forms to be added to the forms database, a user profile, and automatic form-fill function based on the forms database and the user profile.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 16A-C are tables illustrating examples of redirecting references to DS through IIM.

FIG. 17 is a table illustrating examples of making the IIM user interface frame persistent.

FIG. 18 is a table illustrating examples of accessing cookies from the IIM.

FIG. 19 is a table illustrating examples of preserving top frame or IIM frame integrity for DS.

DETAILED DESCRIPTION

A client-server independent intermediary mechanism is described. The independent intermediary mechanism (IIM) mediates information exchanged between a client and servers by having the client-server communication pass through the IIM. This allows the IIM to offer various services. For one embodiment, the IIM may be used to have a central web-accessible set of bookmarks. The IIM may further provide tracking of transactions on the web, providing a user-accessible transaction record. The IIM may further be used to fill in various forms automatically. The IIM may further be used to access multiple accounts, such as e-mail accounts, bank accounts, etc. with a single button. The IIM may further be used to store the user's profile, including passwords to various pages, etc. These and other uses of the IIM are described below.

Figure 1:
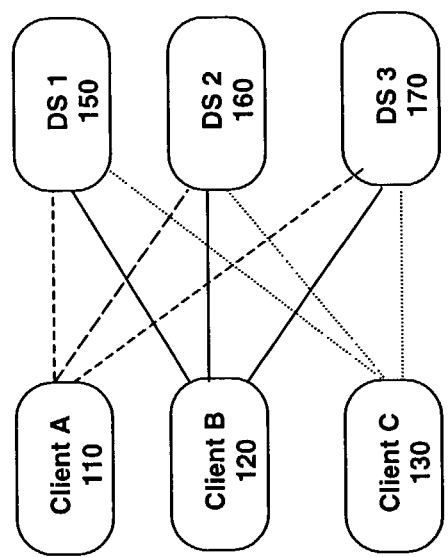
FIG. 1 is a block diagram of a prior art client-server system.
Figure 2:
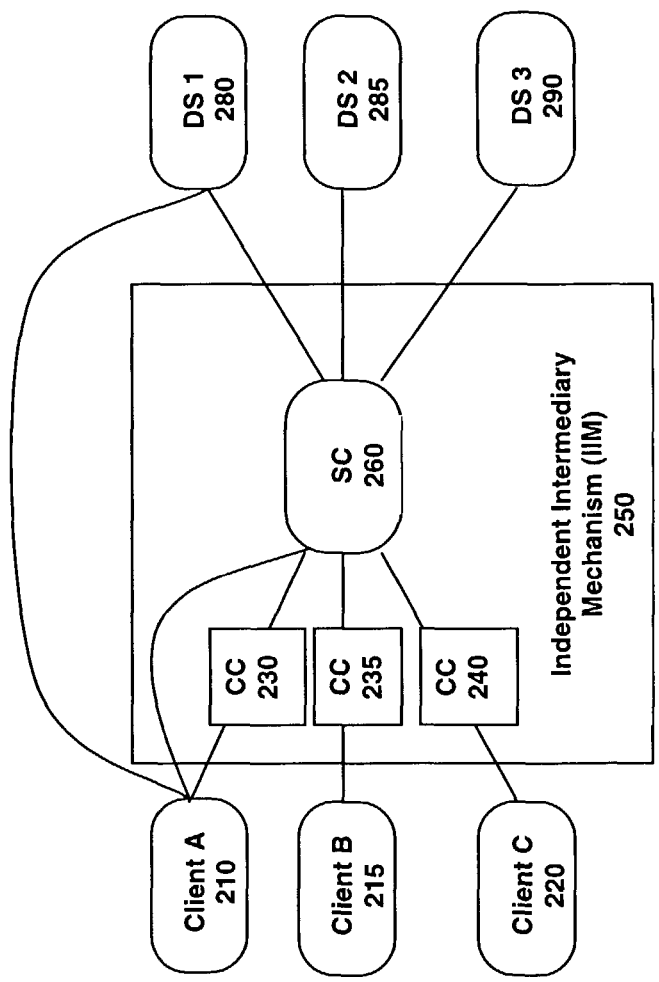
FIG. 2 is a block diagram of one embodiment of the client-server system including the independent intermediary mechanism.

FIG. 2 is a block diagram of one embodiment of the client-server system including the independent intermediary mechanism. Multiple clients A-C 210, 215, 220 access multiple destination servers (DSs) 280, 285, 290, through the independent intermediary mechanism (IIM) 250. Client A 210 is described as an example. It is to be understood that multiple clients are implemented in similar ways.

Client A 210 accesses the IIM 250. For one embodiment, this occurs when the user of the client A 210 accesses the web site hosting the IIM 250. When the IIM 250 is accessed, a new client component (CC) 230 is established. The client component(s) 230, 235, 240 and the server component 260 together form the IIM 250. For one embodiment, the IIM 250 is located on a server accessed by the client A 210 through an Internet connection. For another embodiment, the IIM 250 is located within the local Intranet of client A 210. For yet another embodiment, the IIM 250 is located on the client's own computer.

For one embodiment, the client component 230 is established on the local computer of the client 210. For another embodiment, the client component 230 is on a server, or on a third computer system. The client component 230 is created in response to the client 210 connecting to the IIM 250.

The client A 210 has a connection to the server component 260 through the client component 230. For one embodiment, the client A 210 also establishes a direct connection with the server component 260. This direct connection may be used to communicate certain information directly between the server component 260 and the client A 210. The client 210 accesses the destination servers DS1-3 280, 285, 290 through the IIM 250. For one embodiment, all of the communication between the destination server DS1 280 and the client A 210 is routed through the IIM 250. For another embodiment, certain communications are routed directly between the client A 210 and the destination server 280. For example, certain large images that do not invoke other images or other data may be routed directly in order to speed up processing.

The number of client components 230, 235, 240 depends on the number of clients 210, 215, 220 coupled to the server component 260 at any one time. For one embodiment, the server component 260 consists of multiple components that act together. A block diagram of one embodiment of the IIM 250 may be found in FIG. 4, below.

Figure 3A:
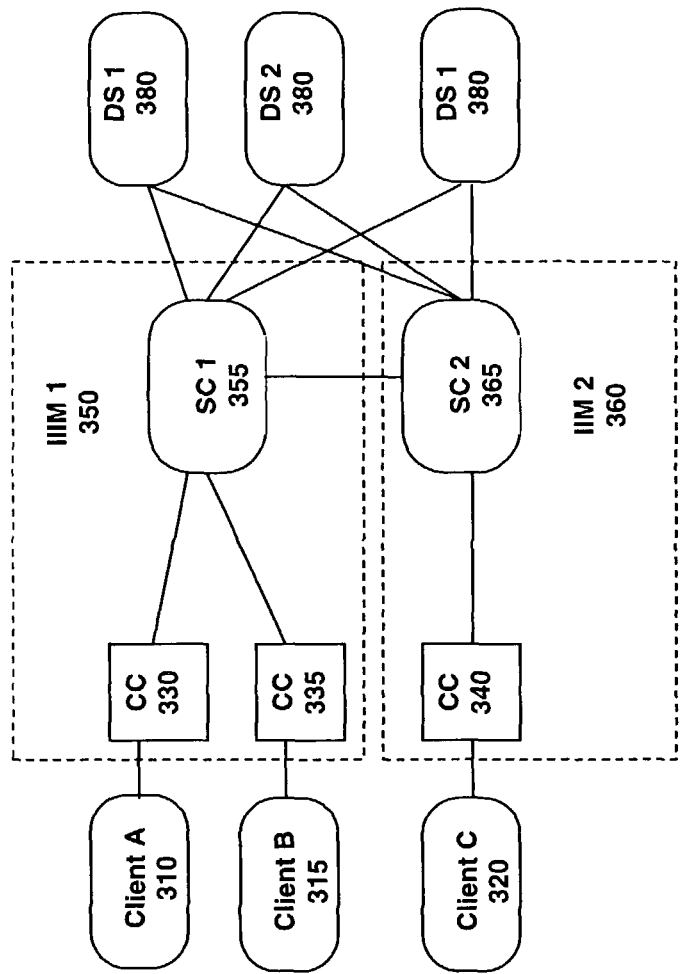
FIG. 3A is a block diagram of one embodiment of the client-server system including multiple independent intermediary mechanisms.

FIG. 3A is a block diagram of one embodiment of the client-server system including multiple independent intermediary mechanisms 350, 360. Each IIM 350, 360 is shown having a corresponding server component, 355, 365. For another embodiment, the server components 355, 365 may be located on a single server, or within a single IIM. Having server components 355, 365 coupled together may serve multiple purposes. For example, if a single IIM 350 has too many users connected to it, the IIM 350 may redirect users to a second IIM 360. For another embodiment, a user may log on to a local IIM 350, for speed reasons, and the local IIM 350 may connect to the user's "home" IIM 360 to retrieve the user's data. For yet another embodiment, the user can connect to their "home" IIM 350, which is remote, and the "home" IIM 350 may redirect the user to a local IIM 360 and send the user's data to the local IIM 360. In this way, the user's connection to the IIM 350, 360 may be optimized.

Figure 3B:
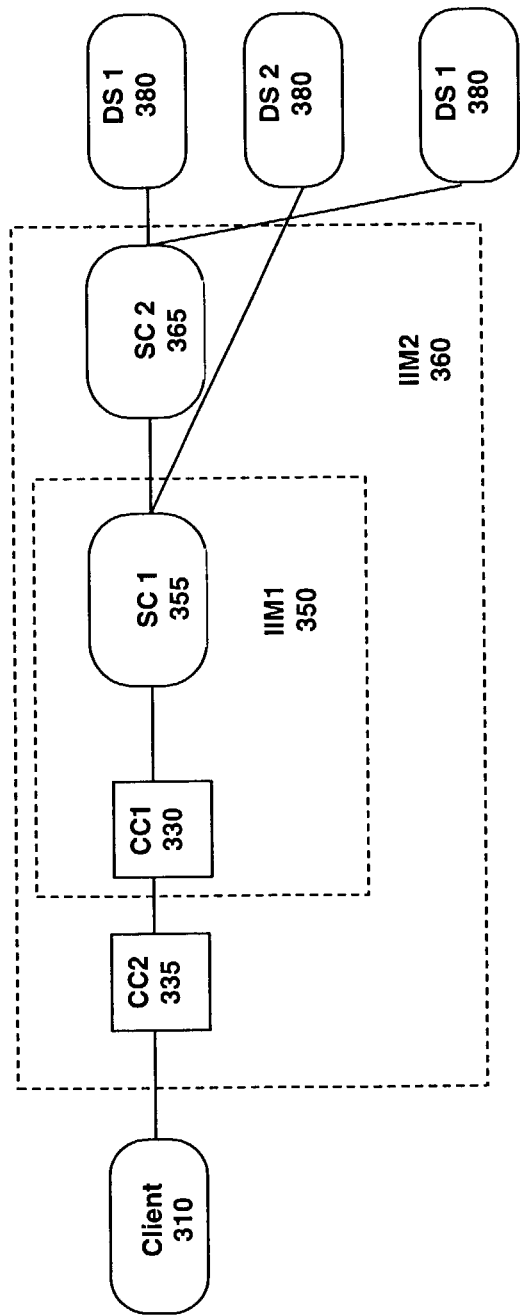
FIG. 3B is a block diagram of another embodiment of the client-server system including multiple independent intermediary mechanisms.

FIG. 3B is a block diagram of another embodiment of the client-server system including multiple independent intermediary mechanisms. In this example, a client 310 is coupled to two IIMs 350, 360. Generally, the client 310 first connects to the first IIM 350. Then, through the user interface of the first IIM, the client 310 connects to the second IIM 360. This may be advantageous if, for example, the first IIM 350 and second IIM 360 provide different services. Thus, for example, one IIM 360 may provide additional account management features, while the other IIM 350 provides form-fill features. By connecting to both IIMs 350, 360, in series, the user has access to the features provided by both IIMs 350, 360.

Figure 4:
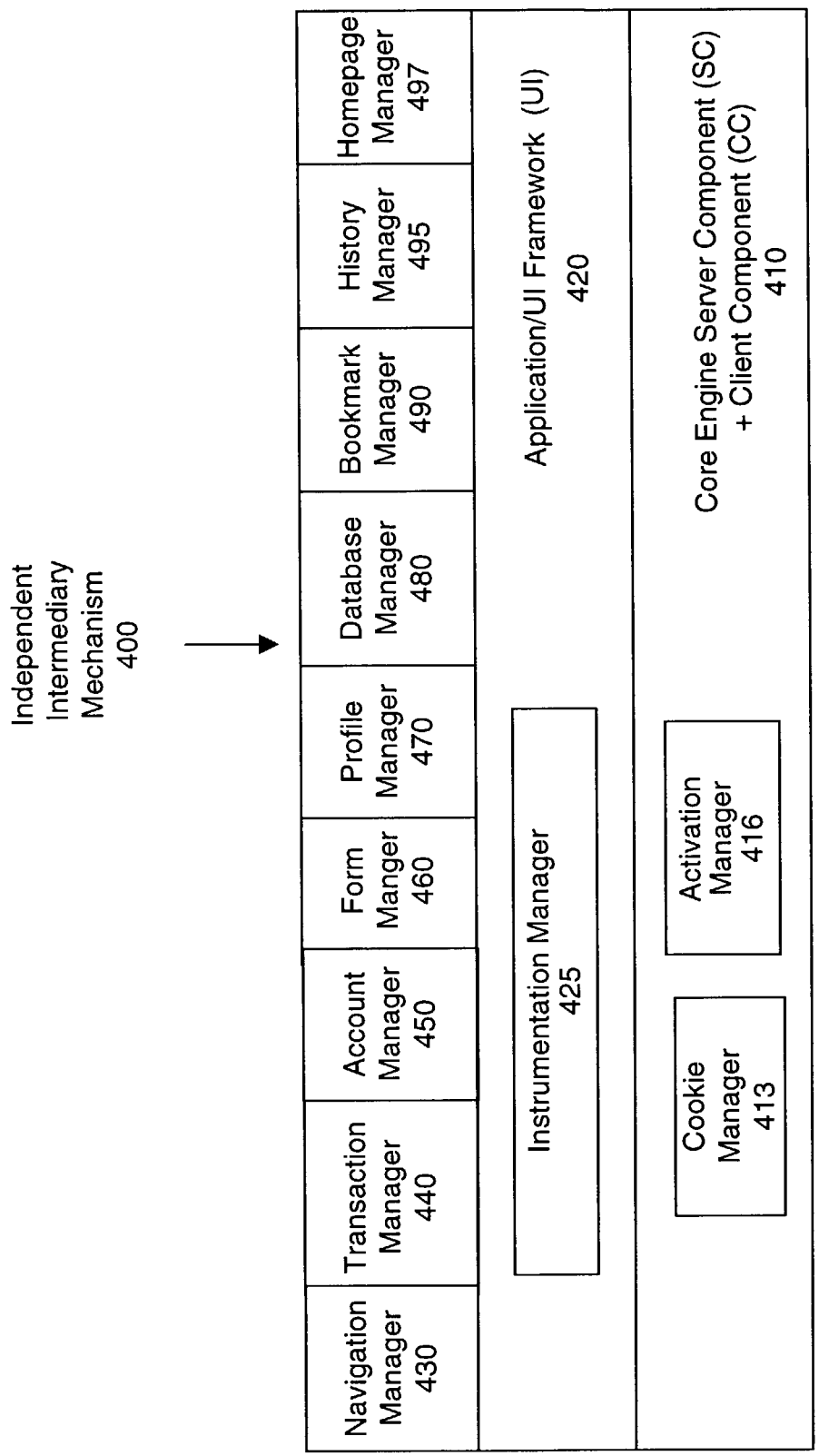
FIG. 4 is a block diagram of one embodiment of the independent intermediary mechanism.

FIG. 4 is a block diagram of one embodiment of the independent intermediary mechanism. The IIM 400 has three layers. The lowest layer of the IIM 400 is the core engine 410. The core engine 410 includes a server component SC and a client component CC. The Server Component, for one embodiment, is resident on the server, and handles all remote actions. The Client Component, for one embodiment, is resident on the client's system, while the client is connected to the IIM 400. For one embodiment, the client component is automatically removed from the client's system when the client disconnects from the IIM 400. The lowest layer also includes a Cookie Manager 413, for managing any cookies received from and being sent to the destination server. The use of such cookies is discussed in more detail below. Furthermore, the lowest layer may include a Activation Manager 416. The Activation Manager 416 determines if information is being transmitted by the destination server. For one embodiment, the Activation Manager 416 further determines if information is being initiated by a user's action. Information transmitted between the DS and the client is instrumented by the IIM 400, as will be described below. The Activation Manager 416 detects when the IIM 400 should review communication between the client and the DS.

The second layer is the application/UI framework layer 420. The application/UI framework layer 420 establishes the basic user interface and IIM engine. The application/UI framework layer 420 creates a persistent frame for the IIM 400. For one embodiment, the application/UI framework layer 420 further includes an instrumenting manager 425, for instrumenting data flowing from the destination server to the client, through the IIM 400. This process of instrumenting is described in more detail below.

The third layer is the applications layer. The applications layer includes multiple applications. The applications listed here are listed as an example, and are not a complete list. The applications layer, for example, may include a Navigation Manager 430. The Navigation Manager 430 permits a user to navigate from destination server to destination server using the IIM 400. The applications layer may further include a Transaction Manager 440.

The Transaction Manager 440 tracks the user's transactions, stores them, and makes them available for the user's review. Transactions are interactions in which a user submits information to a destination server, for example to order an item, ask a question, or otherwise interact with the destination server. The Transaction Manager 440 tracks the data submitted by the user, and any response from the destination server, and permits the user to access this information.

The Account Manager 450 permits the user to log into a variety of accounts, from e-mail to stock trading accounts, using a single click. The Account Manager 450 further permits the user to add accounts to this list. The Form Manager 460 permits the user to fill out forms encountered on destination servers via a single click. This is extremely useful for users that transact business on the web, and often fill out identical forms many times. The Profile Manager 470 is the database of the user's personal information. This information may be edited by the user, and is used to fill in forms via the form manager 460. The Database Manager 480 manages the various databases of the IIM 400.

The Bookmark Manager 490 permits the user to manage bookmarks maintained within the IIM 400. Having bookmarks, URIs of pages the user wishes to save, available in the IIM 400 permits the user to access his or her bookmark list from any computer.

The History Manager 495 permits the user to manipulate the history list of sites the user has previously visited. For one embodiment, the user can change the permanence of the history lists, for another embodiment, the user can delete certain sites from the history list.

The Homepage Manager 497 permits the user to set a homepage that is displayed when the user initially connects to the server providing the IIM 400.

As can be seen, the IIM provides multiple functionalities. A single IIM 400 may include all of the functionalities described above, additional functionalities, or some subset of these functionalities. The IIM's functionality may be extended with additional features.

Figure 5:
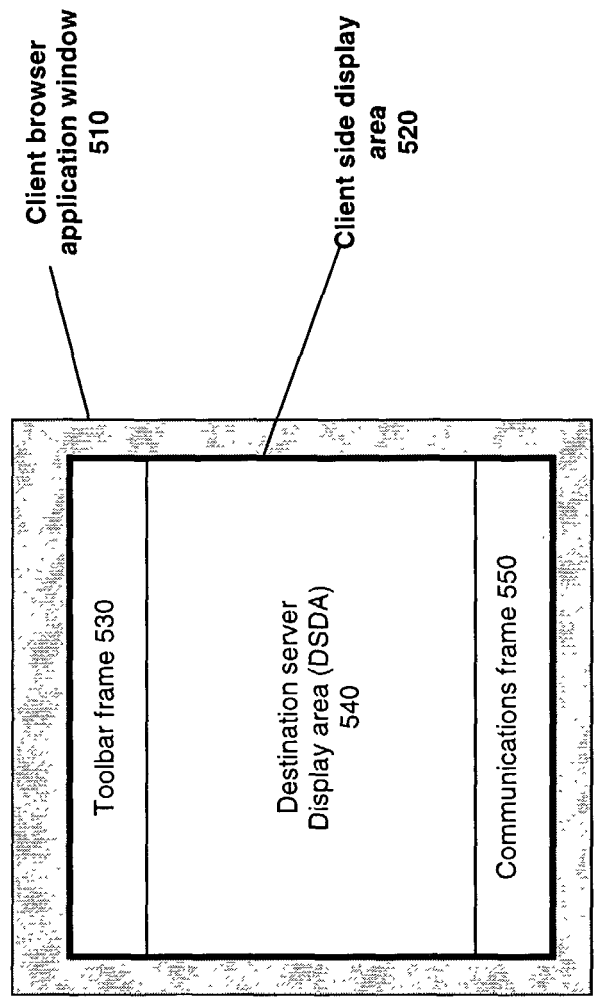
FIG. 5 is a block diagram of one embodiment of the layout of the user interface of the independent intermediary mechanism.

FIG. 5 is a block diagram of one embodiment of the layout of the user interface of the independent intermediary mechanism. The client browser application window 510 is displayed by a browser, such as Netscape Navigator or Microsoft Internet Explorer. The client side display area (CSDA) 520 is the display area available in the browser application window 510. Most browsers have a toolbar and other displays within the browser application window 510. For one embodiment, the IIM is designed to minimize the area of the browser application window that is not the CSDA 520.

The CSDA 520 includes a toolbar frame 530. Although the tool bar frame 530 is referred to as a frame, for one embodiment, the tool bar frame 530 may be implemented in a non-frame format. For one embodiment, the tool bar may be implemented as a separate window. For another embodiment, the tool bar may be implemented as part of the display, not as a frame.

The CSDA 520 further includes a destination server display area (DSDA) 540. The DSDA 540 is the area in which all information from destination servers is presented.

The CSDA 520 further includes a communications frame 550. The communications frame 550 is for communication between the client side and server side of the IIM. Generally, the communications frame 550 is hidden from the user's view. Thus, the user would not see the communication between the client component and the server component.

Figure 6:
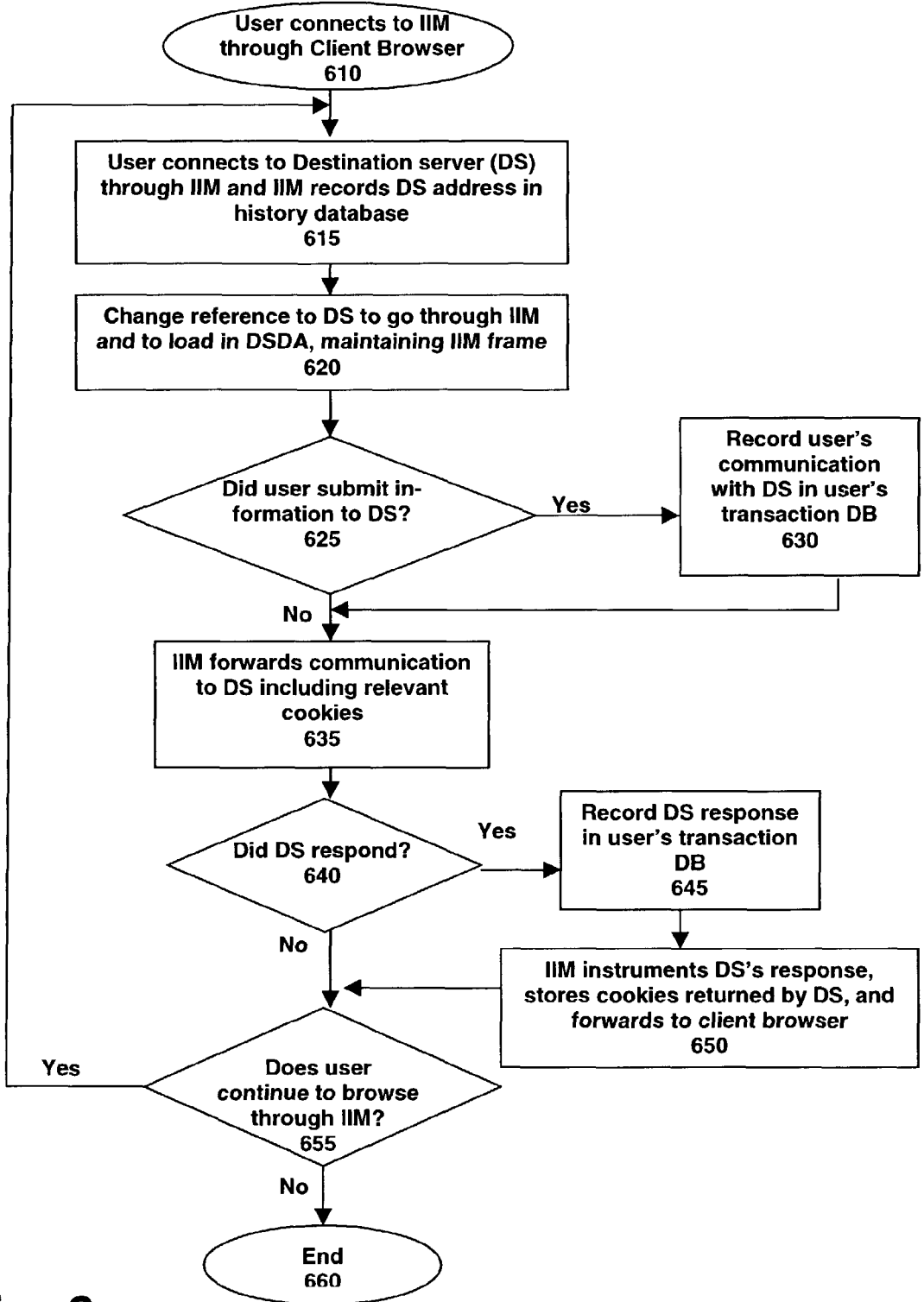
FIG. 6 is a flowchart of an overview of using the independent intermediary mechanism.

FIG. 6 is a flowchart of an overview of using the independent intermediary mechanism. At block 610, the user connects to the IIM through the client browser. For one embodiment, this is done by typing the address of the IIM into the address window of the browser. For one embodiment, the IIM may be the preset homepage of the user, or a bookmark in the client browser.

At block 615, the user connects to a destination server (DS) through the IIM. For one embodiment, this is done by typing the address of the destination server into the address window of the IIM. For another embodiment, the user may select an address from a history list of previously visited sites, from a bookmark list in the IIM, or the destination server may be a preset homepage in the IIM. The IIM records the DS in the history database. The history database tracks the web sites that the user has visited in the past. Such a history database may be useful to permit backtracking, or to visit previously visited sites. For one embodiment, this history database is maintained for a fixed duration of time, or a user preset period of time. For another embodiment, the history database is maintained indefinitely.

At block 620, the process changes the reference to DS to go through the IIM and load the information from the DS in the DSDA, maintaining the IIM frame. This is described in more detail below.

At block 625, the IIM determines whether the user submitted information to the destination server. For one embodiment, the actual test is whether information that is "sensitive" or "of interest" is submitted to the DS. For example, if a user selected a radio button for the next display, the response would be "no" even though some information was submitted. For one embodiment, the answer to this query is yes only if information that is in the user's profile is submitted. For one embodiment, the answer to this query is provided by the user through the user interface. If the answer is yes, the process continues to block 630.

At block 630, the user's communication with the DS is recorded in the user's transaction database. For example, if the user ordered an item from a destination server site, the form that was filled in by the user, including all of the information filled in, would be recorded in the transaction database. This transaction database is available to the user. The process then continues to block 635. If, at block 625, the answer was no, the process continues directly to block 635.

At block 635, the IIM forwards the communication, i.e. the information submitted by the user, to the DS. This communication includes relevant cookies. A cookie is a packet of information sent by a destination server to a browser and then sent back by the browser each time it accesses that server. Cookies can contain any arbitrary information the server chooses and they are used to maintain state between otherwise stateless transactions. Generally, cookies are maintained in a user's browser. However, for one embodiment, the IIM maintains the user's cookies. This permits a user to log into a site, and have the appropriate cookies available, no matter from what web client device or client browser the user accesses the site.

At block 640, the process determines whether the destination server responded to the user's submission of information. For one embodiment, some destination servers respond, with a thank you page, other data pertaining to order number, shipping code, delivery date, etc., when information is submitted to them. If the destination server responds at block 640, the process continues to block 645.

At block 645, the DS's response is recorded in the user's transaction database, and associated with the user's submitted information. Thus, when the user reviews the transaction, he or she can review the entire transaction, including the DS's response.

At block 650, the IIM instruments the DS's response, stores any cookies returned by the DS, and forwards the response to the client browser. One embodiment of this process is illustrated in more detail in FIG. 7, below. Tables of some results of the process of instrumenting are illustrated in FIGS. 16A-C, and FIGS. 17-19.

At block 655, the process tests whether the user continues to browse through the IIM. The user continues to browse, the process returns to block 615. Otherwise, the process ends at block 660.

Figure 7:
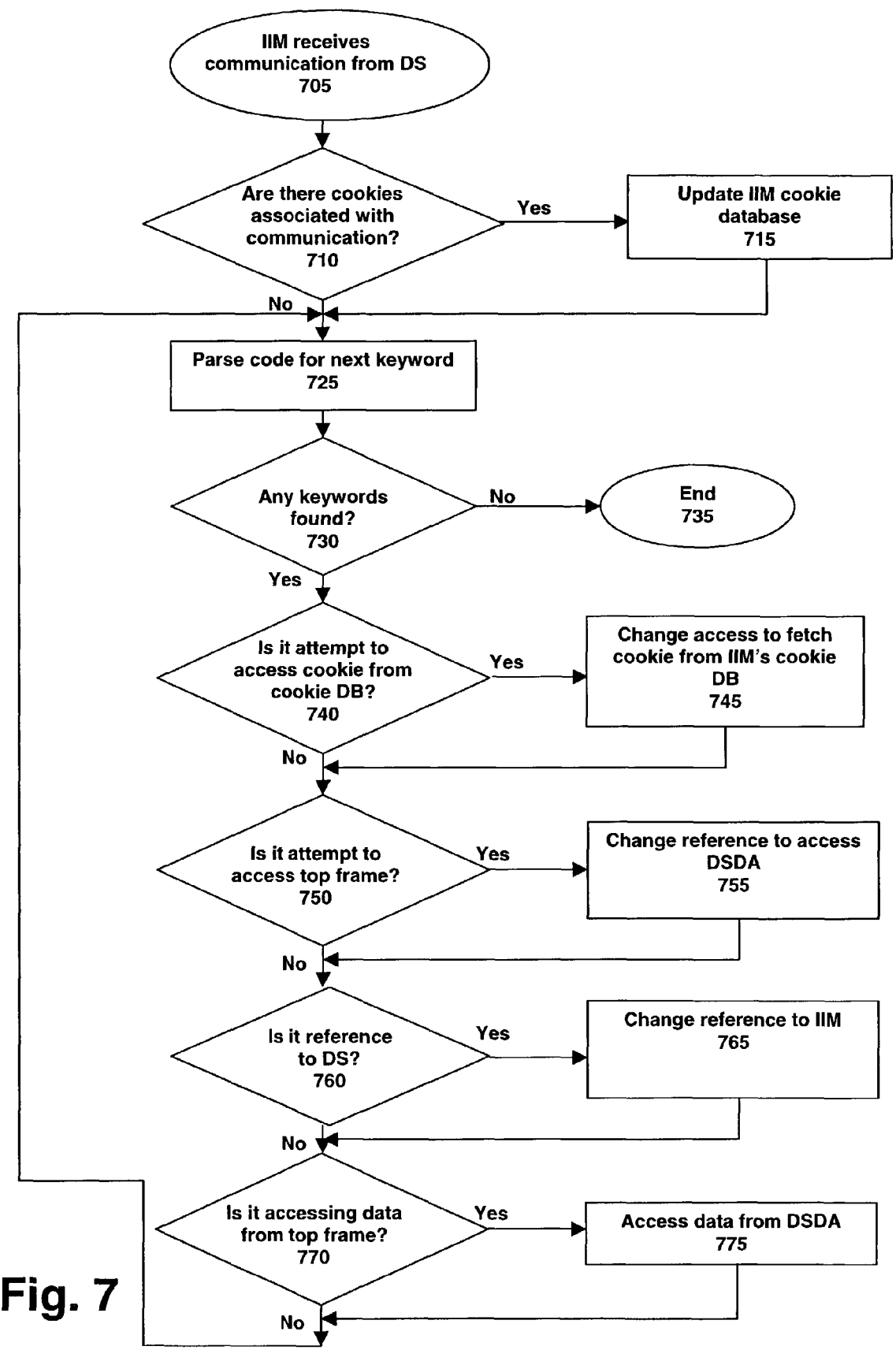
FIG. 7 is a flowchart of one embodiment of the process of displaying information from a destination server through the independent intermediary mechanism.

FIG. 7 is a flowchart of one embodiment of the process of instrumenting data displayed from a destination server through the independent intermediary mechanism. For one embodiment, FIG. 7 is a more detailed flowchart of block 650, in FIG. 6. At block 705, the IIM receives a communication from the DS. For one embodiment, this occurs in response to a user contacting a DS through the IIM.

At block 710, the process tests whether there is a cookie or multiple cookies associated with the communication. Cookies may be sent by the DS to the client, to be stored on the client browser. If a cookie is associated with the communication, the process continues to block 715. At block 715, the IIM cookie database is updated with the new cookie. For one embodiment, cookies sent by the DS to the client browser are handled through the IIM. Thus, the IIM would store all of the cookies for a DS, and give the DS its cookies. This is advantageous because it permits a user to access a DS from any computer, and all of the user's cookies are immediately available through the IIM. The process then continues to block 725. If no cookies were associated with the communication, the process continues directly to block 725.

At block 725, the process parses the code to find the next keyword. For one embodiment, keywords are tags in HTML, or known keywords in Java or JavaScript. FIGS. 16-19 illustrate some examples of keywords that may trigger this process. For another embodiment, keywords may be any triggering signal that indicates that an action may be performed.

At block 730, the process tests whether a keyword was found. If no keyword was found, the process continues to block 735, and ends. If the communication has no remaining keywords, the document has been fully instrumented, and is ready for display to the user. For one embodiment, certain communications may have no keywords at all. In that case, this process would end after a single pass. For yet another embodiment, under some circumstances, the process may ignore certain keywords. Certain references are not altered in the communication. For example, references that call static images, images that do not communicate information to the user and do not have embedded references, may be of no interest. For example, if the keyword calls a large passive figure with multiple components, the process may ignore the entire figure, by tagging figure related communications, and exit out of this process even if keywords remain. By altering only those references that are of interest, the process may be sped up. If a keyword was found, the process continues to block 740.

At block 740, the process tests whether the keyword is an attempt to access a cookie from the cookie database. If the keyword is an attempt to access a cookie, the process continues to block 745. At block 745, the access attempt is changed to fetch the cookie from the IIM's cookie database. Some examples of this process are provided in FIG. 18. For one embodiment, the IIM's cookie database may access the client browser's cookie database in order to determine whether there are additional cookies on the client browser. For one embodiment, the IIM can, with the user's permission, copy cookies from the browser cookie database to the IIM. This simplifies moving from direct access of a DS to accessing a DS through the IIM. The process then continues to block 750.

If the keyword is not an attempt to access a cookie, the process continues directly to block 750.

At block 750, the process tests whether the keyword is an attempt to access the top frame or IIM frame. If the keyword is an attempt to access the top frame or IIM frame, the process continues to block 755. At block 755, the access attempt is changed to access the top area of the destination server display area (DSDA). Some examples of this process are provided in FIG. 17. The process then continues to block 760.

If the keyword is not an attempt to access the top of IIM frame, the process continues directly to block 760.

At block 760, the process tests whether the keyword is a reference to the destination server. If the keyword is a reference to the destination server, the process continues to block 765. At block 765, the reference is changed to be fetched through the IIM. Some examples of this process are provided in FIGS. 16A-C. The process then continues to block 770.

If the keyword is not a reference to the destination server, the process continues directly to block 770.

At block 770, the process tests whether the keyword is an attempt to access data from the top frame or IIM frame. If the keyword is an attempt to access data from the top frame or IIM frame, the process continues to block 775. At block 775, the access attempt is changed to fetch data from the topmost frame of the DSDA. Some examples of this process are provided in FIG. 19. The process then returns to block 725, and parses to find the next keyword.

For one embodiment, the above process may be triggered by a user. For example, a user may select a link, activate a JavaScript function, or otherwise initiate communication between the destination server and the client. The same process may occur in response to a cookie being sent or received, or a keyword being found as described above with respect to FIG. 7.

Figure 8:
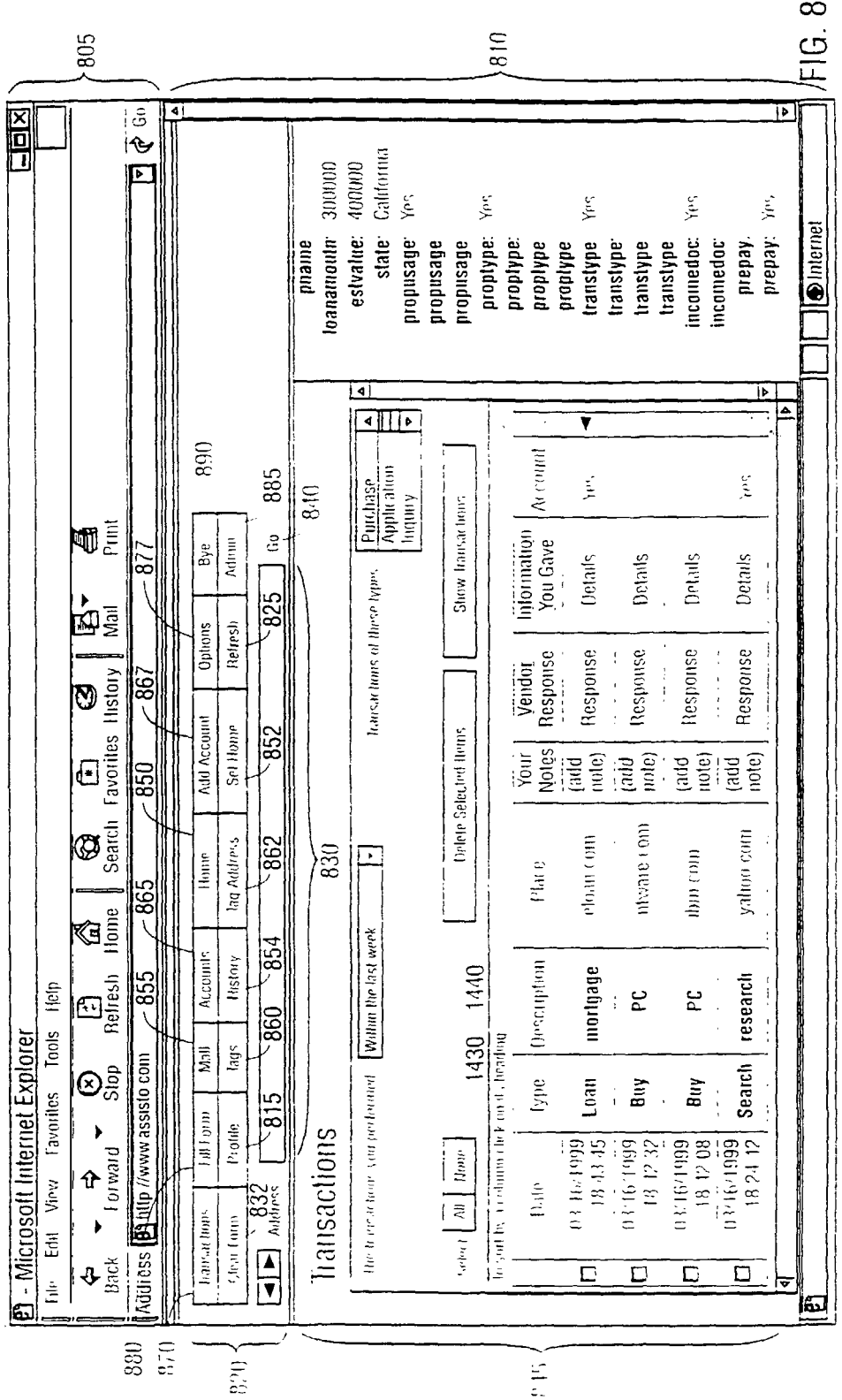
FIG. 8 illustrates one embodiment of the user interface of the independent intermediary mechanism.

FIG. 8 illustrates one embodiment of the user interface of the independent intermediary mechanism. The user interface includes a browser toolbar 805. For one embodiment, the IIM may configure the browser such that the browser toolbar area 805 is not displayed when the IIM is active. The display area 810 of the browser includes the IIM toolbar 820, a hidden communications frame 815, and the destination server display area 845.

The IIM toolbar 820 includes the known browser controls 825, such as back, forward, refresh, stop, etc. Additional browser controls 825 may be added. The toolbar 820 further includes an address entry control 830, where a user can type a destination server address in order to access the DS.

The IIM toolbar 820 may further include buttons, or other selection mechanisms that permit a user to configure and use the IIM. The buttons may include Home, selecting a user's preset homepage, etc. The homepage is preset using the Set Home button 852. The buttons may further include the Mall button, giving one-button access to shopping. The buttons may further include Tags 860, displaying a list of a user's bookmarks. Bookmarks are added by selecting the Tag Address while visiting a web site, or by selecting the Tag Address button 862, and typing the address of a location to be bookmarked.

The buttons may further include Accounts 865, permitting single-button log-on to a variety of accounts. These accounts are added with the Add Account button 867, as will be described below.

The buttons may also include a Transactions button 870, that permits a user to review his or her transactions. This is illustrated in the destination server display area 845 of FIG. 8. The Profile button 875 permits the user to enter his or her personal data. The Fill-Form button 880 permits the user to fill in a form using the personal data from the user's profile or by using information submitted previously using the same form. If a form is displayed on the destination server display area 845, and the user selects the fill-form button 880, the form is automatically filled in with the user's information. The Clear Form button 882 permits a user to remove the information filled into a form. This provides an additional level of security to the user.

The Admin button 885 provides access to account administration services. For one embodiment, the Admin button 885 is only available to those users who are authorized administrators. For one embodiment, the Admin button 885 is only displayed if the user is authorized to access account administration services.

The toolbar 820 further includes a Bye button 890, which logs off the user from the IIM. The toolbar 820 illustrated is exemplary. The content and organization of the buttons on the toolbar 820 may be changed without changing the invention.

Figure 9:
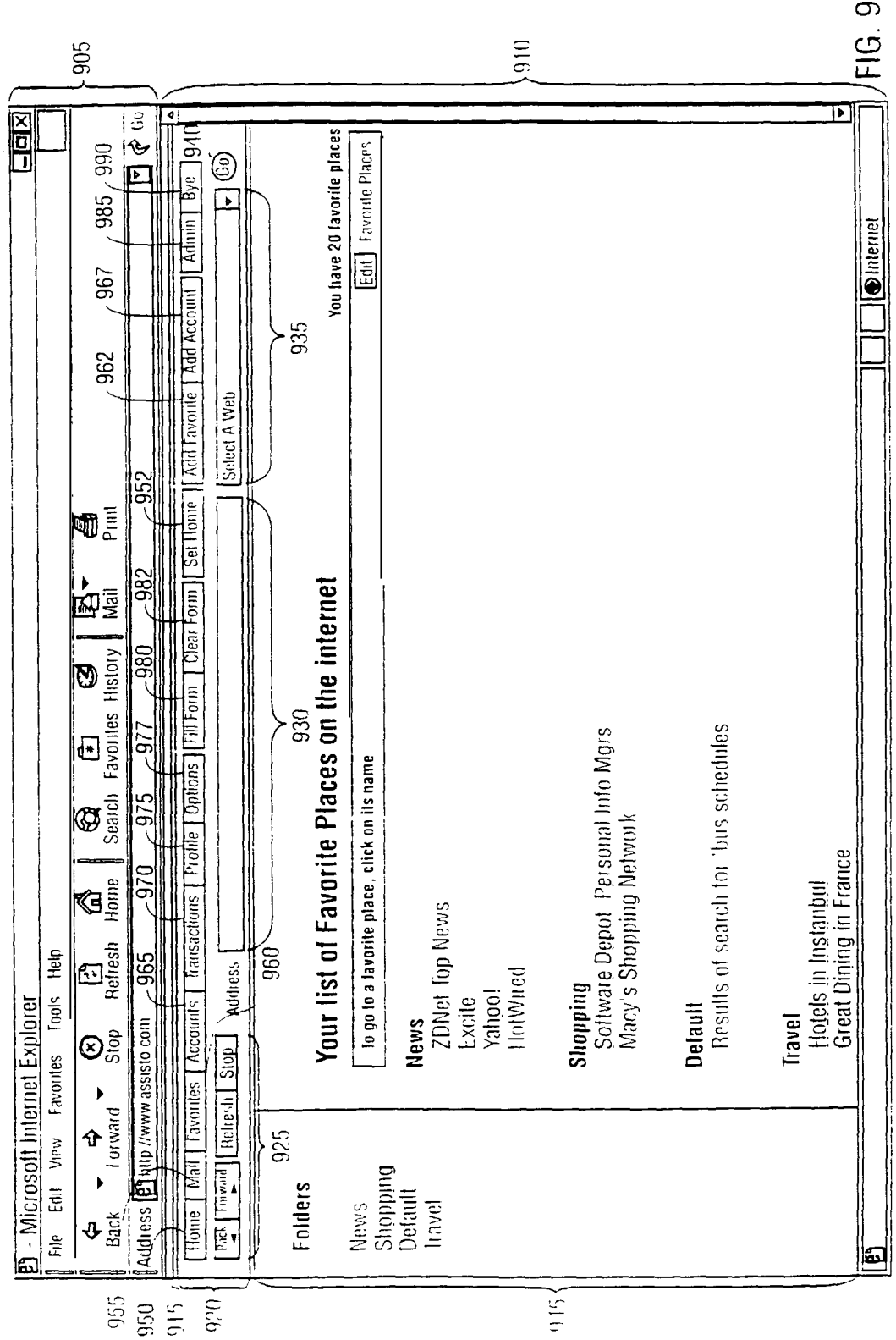
FIG. 9 illustrates another embodiment of the user interface of the independent intermediary mechanism.

FIG. 9 illustrates another embodiment of the user interface of the independent intermediary mechanism. As can be seen, the user interface may be flexibly implemented. Certain features may be provided by one interface and not provided by another. Furthermore, the look and feel of the user interface may be altered. The user may, for example, access all of the IIM features through pull-down menus, such as the pull-down menu 935, or radio buttons instead of buttons. One skilled in the art understands other types of user interface changes that may be made without departing from the broader spirit and scope of the invention as set forth in the appended claims.

Figure 10:
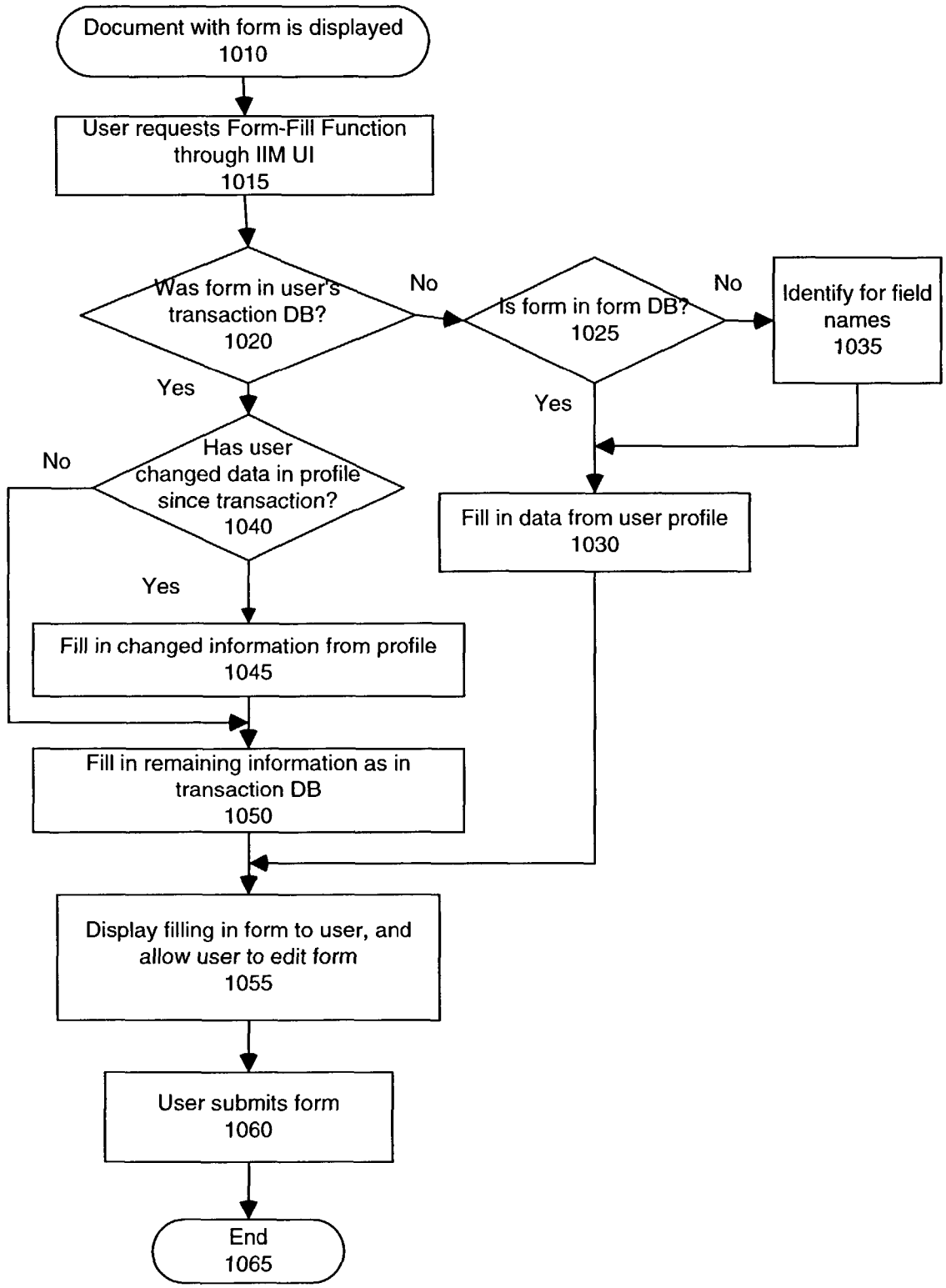
FIG. 10 is a flowchart of one embodiment of the form fill functionality.

FIG. 10 is a flowchart of one embodiment of the form fill functionality. At block 1010, a document with a form is displayed. For one embodiment, this is a result of a user accessing a destination server location that includes a form. This form may be an order form, an information request form, or any other form that may be encountered on the Web.

At block 1015, the user requests the form-fill function through the IIM user interface. For one embodiment, the user presses the form-fill button. For another embodiment, the form fill may be automated. For yet another embodiment, the user can select whether the form fill function is automatically engaged.

At block 1020, the process determines whether the form is in the user's transaction database. The user's transaction database has records of previously accessed and filled-in forms for the particular user. The transaction database may maintain such records for a limited time, or the user may delete transaction records. Thus, merely because a user has been to a particular site previously may not mean that the form is in the user's transaction database. If the form is in the user's transaction database, the process continues to block 1040, otherwise, the process continues to block 1025.

At block 1025, the process determines whether the form is in the form database. The form database is maintained by the IIM and includes "known" forms. Such known forms have associations between form control identifiers in the form and profile items. Thus, for example, a form control identifier that is labeled "name" may have a link to the "First Name Last Name" item in the user profile. If the form is known, the process continues to block 1030. At block 1030, the form control identifiers in the form are filled in from the user profile. The process then returns to block 1055.

If the form is not known, the process continues to block 1035. At block 1035, the form controls are identified, based on the name of each control. Each control name is associated with entries in the user profile. The process then continues to block 1030, and the data is filled into the form from the user profile. For one embodiment, block 1035 is skipped. This type of "guessing" may be user enabled, or may be only attempted for forms that are similar to known forms.

At block 1020, if the form was found in the user's transaction database, the process continued to block 1040. At block 1040, the process tests whether any data in the user profile has been changed since the transaction in the transaction database was recorded. Transaction records are dated, as are changes to the user profile. A user profile may be changed by the user, for example, to change a credit card expiration date, number, or home address. If a user profile change of a relevant field is dated after the transaction record date, the process continues to block 1045, otherwise, the process continues directly to block 1050.

At block 1045, the changed information is filled in from the user profile. In this way, the user only had to update his or her records once, in the profile, and that change is carried through the IIM. For one embodiment, this step may be skipped. For another embodiment, this step may be user enabled.

At block 1050, the remaining form control identifiers in the form are filled with data from the transaction database. The process then continues to block 1055.

At block 1055, the filled-in form is displayed to the user, and the user is permitted to edit the data in the form. The user, for example, may not wish to provide certain data to a destination server. The user may chose to erase such data. Alternatively, the form may request data that is not found in the user's profile. The user may chose to fill in such data.

Figure 13:
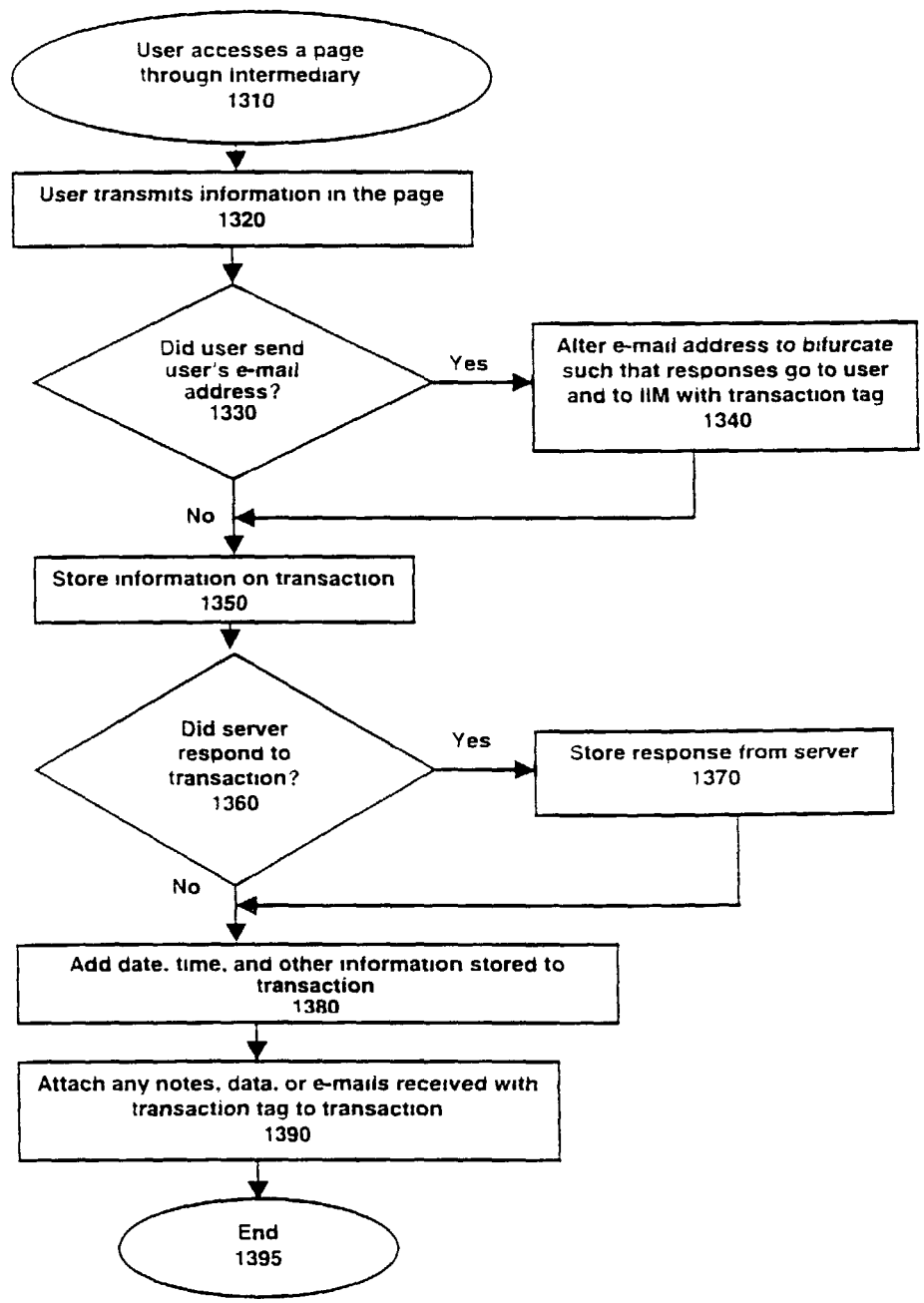
FIG. 13 is a flowchart of one embodiment of the transaction management functionality.

At block 1060, the user submits the form to the destination server. For one embodiment, the IIM stores the information submitted to the server in the user's transaction database. This is illustrated in FIG. 13 below. At block 1065, the process ends. For one embodiment, the user may optionally select whether to use the user profile, transaction database, or both, and in what order, for form fill functions.

Figure 11:
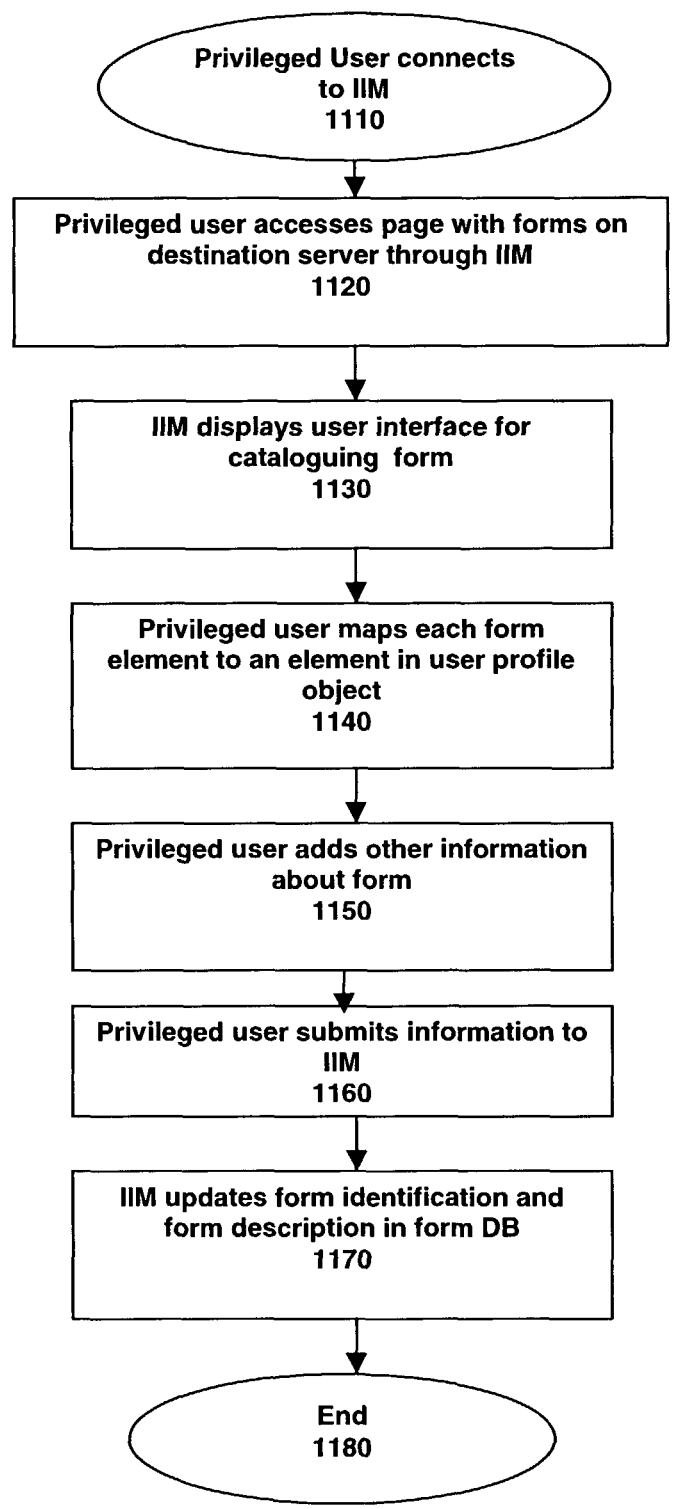
FIG. 11 is a flowchart of one embodiment of the learning process in the database.

FIG. 11 is a flowchart of one embodiment of the learning process in the database. At block 1110, a privileged user connects to the IIM. For one embodiment, this privileged user is an employee of the group maintaining the IIM. For another embodiment, this "user" is an artificial intelligence unit that is used to identify forms, as will be described below. Such intelligent recognition programs are known in the art.

At block 1120, the privileged user accesses a destination server page with a form through the IIM. At block 1130, the IIM displays a user interface for cataloguing the form.

At block 1140, the user maps each form control to an element in the user profile object. The user profile is set up to contain a large number of possible data elements. Each form control should have a corresponding profile element. If no profile element is found for a form control, that form control may be tagged as "form specific." For one embodiment, multiple elements in the user profile may be associated with a single form control, or vice versa.

At block 1150, other information about the form is added. This information may include such information as the address of the form, whether the connection with the destination server that serves the form is a secure connection, whether the form is of a particular classification, etc.

At block 1160, the user submits the information to the IIM.

At block 1170, the IIM updates the form identification and form description in the form database to include the information added by the user. For one embodiment, the updating is a periodic batch updating. For one embodiment, a single central form database is maintained. In that instance, the IIM's updating may include sending the new form to other IIMs. Alternatively, each IIM may maintain its own separate form database. For yet another embodiment, an IIM may have a central form database, and a separate internal form database. This may be useful, for example, for an IIM implemented within a company which has the general form database for pages accessed outside the company, and a separate internal database for internal web page forms.

At block 1180, the process ends. Of course, the privileged user may enter multiple entries, and may start the process again at block 1120.

Figure 12A:
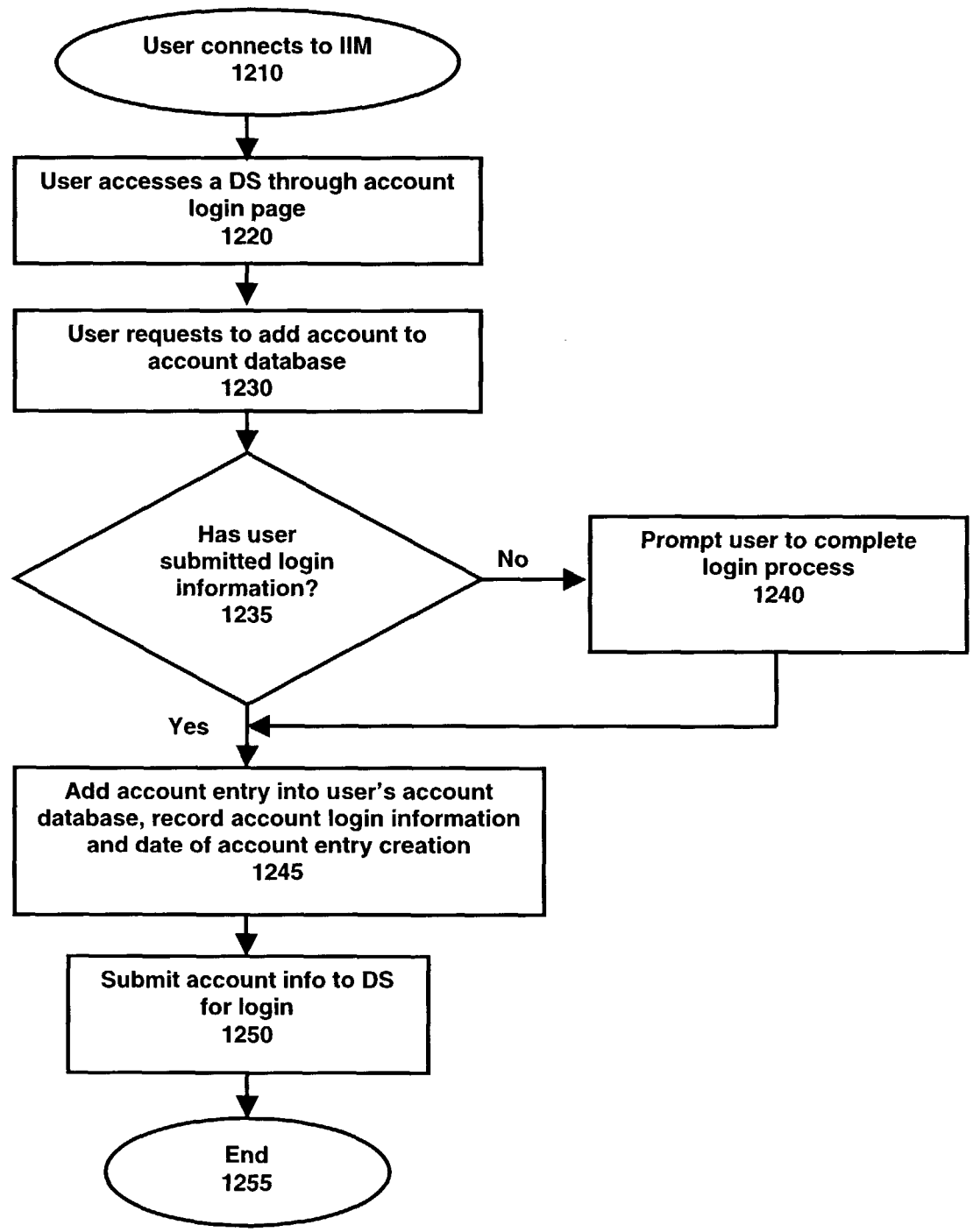
FIG. 12A is a flowchart of one embodiment of adding accounts.

FIG. 12A is a flowchart of one embodiment of adding accounts. At block 1210, the user connects to the IIM through a client browser. At block 1220, the user accesses a destination server through the IIM. For one embodiment, the user accesses the account log-in page of the DS. This may be, for example, the account log-in page of the user's bank, of a portal, or of any other DS.

At block 1230, the user requests to add the account to the user's account database. Each user may have an account database, which includes a list of accounts the user can access with a single click.

At block 1235, the process determines whether the user has submitted log-in information to the account log-in page. If the user has not submitted the information, the process continues to block 1240, and the user is prompted to complete the log-in process. For one embodiment, if the account log-in process includes multiple pages, the user may indicate the end of the log-in process by pressing a certain key, or through other means. The process then continues to block 1245. If the user has submitted all of the log-in information, the process continues to block 1245 directly.

At block 1245, the account entry is added to the user's account database. The account log-in information and data of account entry creation are recorded. For one embodiment, further information may be recorded. For yet another embodiment, only the user's log-in procedure is recorded.

At block 1250, the account information is submitted to the DS for login. At block 1255, the process ends.

Figure 12B:
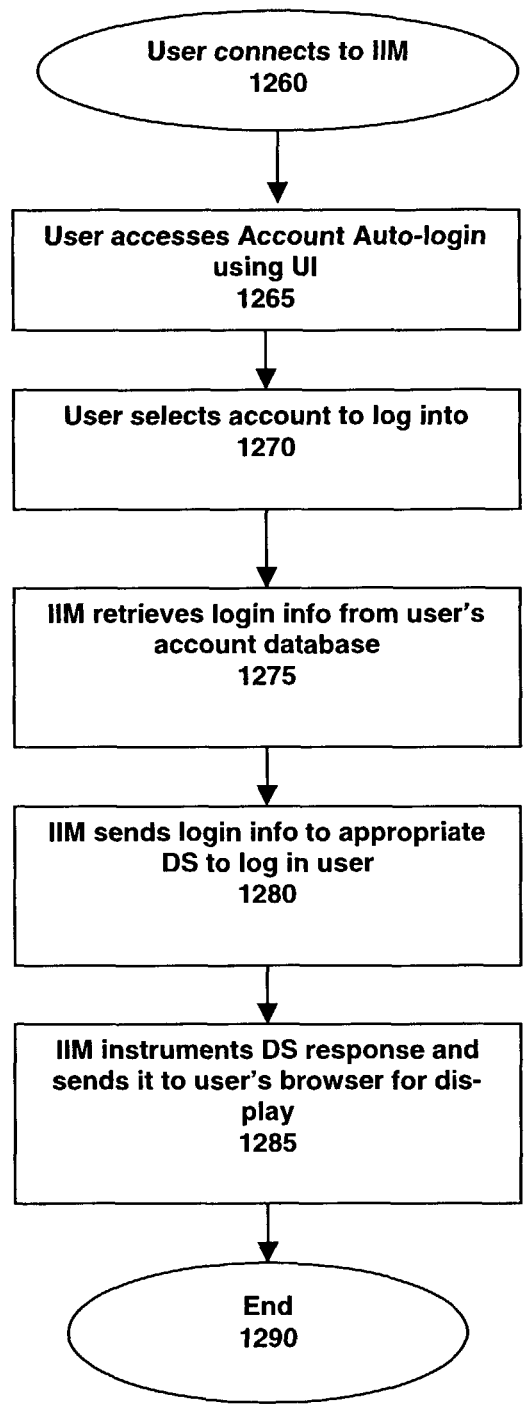
FIG. 12B is a flowchart of one embodiment of accessing an account through an auto-log-in feature.

FIG. 12B is a flowchart of one embodiment of accessing an account through an auto-log-in feature. At block 1260, the user connects to the IIM. At block 1265, the user accesses the account auto-log-in feature using the IIM user interface. For one embodiment, this is done by the user pushing the account button.

At block 1270, the user selects an account to log into. For one embodiment, the user may have multiple accounts. In that instance, the IIM displays the accounts that the user has. For another embodiment, if the user only has a single account, that account is automatically selected when the user accesses the auto-log-in feature.

At block 1275, the IIM retrieves login information from the user's account database. As discussed above, the user's previous account log-in is monitored and recorded. This information is retrieved at block 1275.

At block 1280, the IIM sends the log-in information to the appropriate destination server to log-in the user. The account information includes the address of the DS. The IIM accesses the DS as a client, and sends the user's information.

At block 1285, the IIM instruments the DS's response and sends it to the user's browser for display. As discussed above, the response is instrumented such that references of interest are routed through the IIM. The user can now use the account, as usual. At block 1290, the process ends.

FIG. 13 is a flowchart of one embodiment of the transaction management functionality. At block 1310, the user connects to the IIM.

At block 1320, the user transmits information in a form to the destination server. For one embodiment, the user first accesses a destination server page including a form through the IIM. This form may be an order form, an e-mail form, or any other type of form. The user then fills in the form and submits it to the DS. For one embodiment, the user may use the form-fill method described above to fill-in the form.

At block 1330, the process determines whether the user sent the user's e-mail address to the DS. The user may submit his or her e-mail address so the DS can send responses directly to the user's e-mail. For example, certain systems may send confirmation e-mails or alert notices to the user via e-mail. If the user submitted his or her e-mail address, the process continues to block 1340. Otherwise, the process continues directly to block 1350.

At block 1340, the e-mail address submitted to the DS is altered. Specifically, the e-mail address is bifurcated, generated two e-mails. The first e-mail goes to the user's e-mail address, as entered. The second e-mail goes to the IIM. The second e-mail includes in its address the IIM and the transaction tag that identifies the transaction number to which the e-mail belongs. This allows the IIM to handle the e-mail. The process then returns to block 1350.

At block 1350, the IIM records a transaction in the user's transaction database and associates the submitted information with the transaction. The transaction, for one embodiment, has a transaction number.

At block 1360, the IIM determines whether there is a response from the DS. If there is a response, the process continues to block 1370. Otherwise, the process continues directly to block 1380.

At block 1370, the IIM records the response from the DS in the user's transaction database. For one embodiment, the destination server may respond to the user. This response is associated with the transaction record. In this way, the user may review the transaction record, including the response.

At block 1380, further information is recorded about the transaction. For one embodiment, this information may include the date and time of the transaction, and other information.

At block 1390, any notes, data, or e-mails received with the transaction tag are attached to the transaction. This may occur at any time, while the transaction is being recorded, or after that. The user may attach any data to the transaction, and the IIM may automatically attach any e-mails received with the transaction tag.

At block 1395, the process ends.

Figure 14:
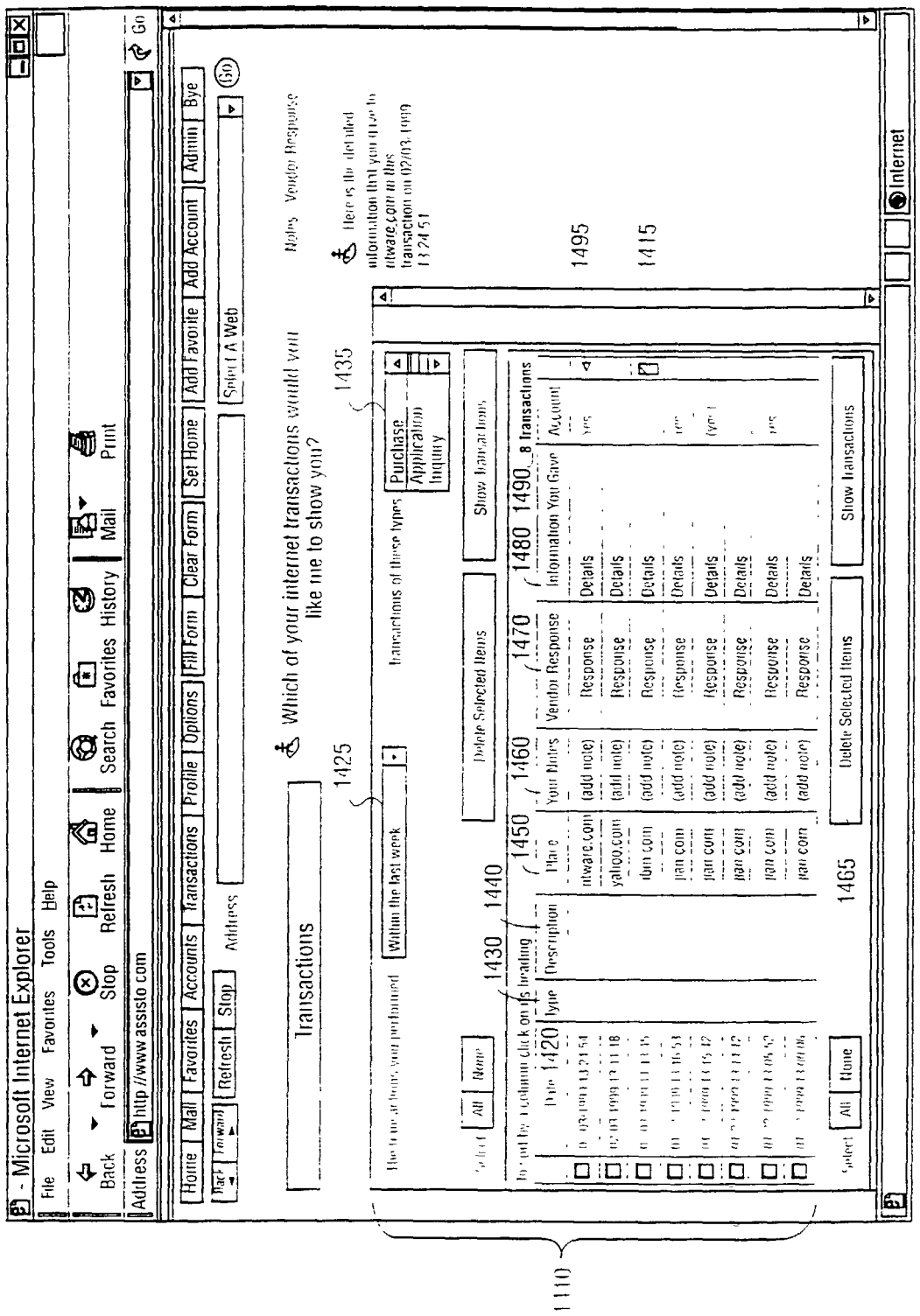
FIG. 14 illustrates one embodiment of the listing of transactions.

FIG. 14 illustrates one embodiment of the listing of transactions. The transaction list 1410 may be sorted by date, using a menu 1425. The transactions may also be sorted by type 1435. For one embodiment, alternative methods of searching transactions may also be implemented. For example, a user may search the transaction records for purchases from a certain destination server.

Each transaction record may include one or more of the following: date 1420, transaction type 1430, and description 1440 of the transaction. The record may further include the place 1450, the location from where the transaction was recorded. The user may add and edit additional notes 1460. Furthermore, the user may also add attachments 1415 to the transaction record. For example, the user may attach e-mails, documents, video, or other types of data. For one embodiment, e-mails may be redirected through the IIM and automatically attached to the transaction.

The vendor response 1470 is also recorded. The information the user provided 1480 during the transaction is also included in the transaction record. The transaction may further include the information whether the transaction belongs to one of the accounts 1490 in the user's account database. The user is permitted to delete selected transaction records using a delete button 1465.

Figure 15A:
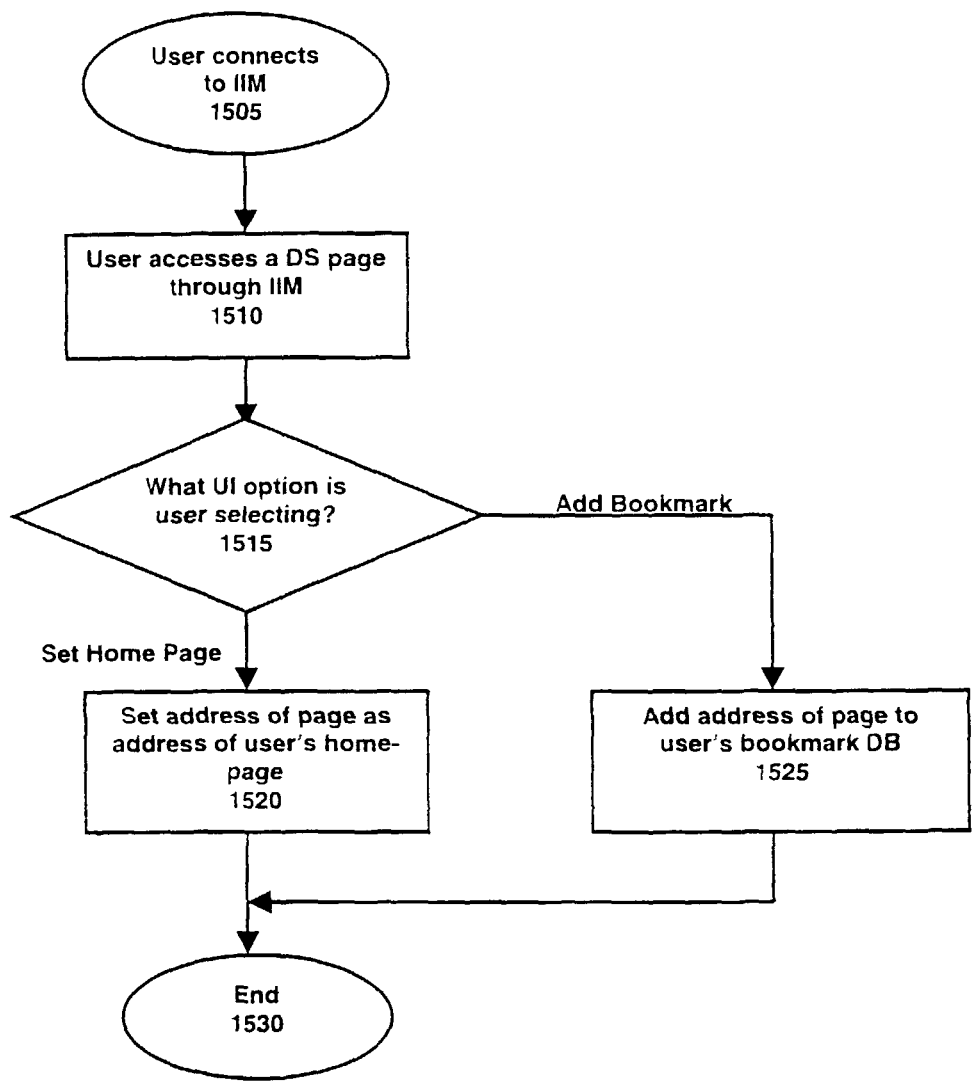
FIG. 15A is a flowchart of one embodiment of selection of a home page or a bookmark.

FIG. 15A is a flowchart of one embodiment of selection of a home page. The user connects to the IIM at block 1505.

At block 1510, the user accesses a destination server page through the IIM. At block 1515, the process determines which option the user is selecting.

If the user is selecting the add bookmark option, the process continues to block 1525. At block 1525, the address of the page is added to the user's bookmark database. This database is accessible to the user, to permit the user to access various web sites without typing the address of the site. The process then continues to block 1530, and ends.

If the user selected the set home page option at block 1515, the address of the page is set as the user's homepage. The user's homepage is called up when the user initially connects to the IIM. For one embodiment, the homepage is preset. For another embodiment, the user may not alter the homepage, and the homepage is customizable but includes advertising. The process then continues to block 1530, and ends.

Figure 15B:
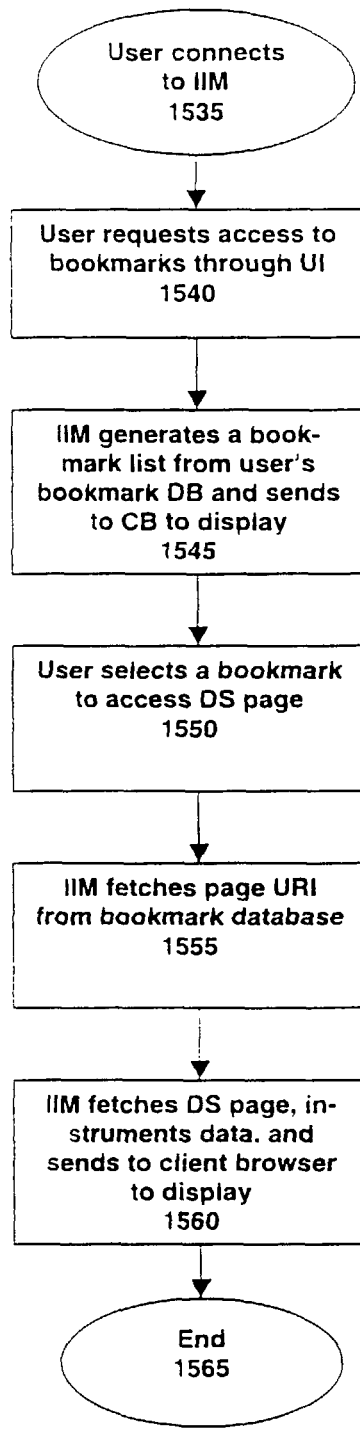
FIG. 15B is a flowchart of one embodiment of using the bookmark functionality.

FIG. 15B is a flowchart of one embodiment of using the bookmark functionality. At block 1535, the user connects to the IIM. At block 1540, the user requests access to the user's bookmarks through the IIM user interface. For one embodiment, the user requests the bookmarks by pressing the "Tags" button on the user interface.

At block 1545, the IIM generates a bookmark list from the user's bookmark database, and sends the list to the client browser to display. For one embodiment, the bookmark list is displayed in the destination server display area. For another embodiment, the bookmark list is displayed in a separate window, or a separate frame.

At block 1550, the user selects a bookmark to access a destination server page.

At block 1555, the IIM fetches the page address corresponding to the selected bookmark from the bookmark database. The bookmark database includes the actual address of the bookmark.

At block 1560, the destination server page is fetched by the IIM. The data from the destination server is instrumented and is sent to the client browser for display. In this way, the user can access bookmarks stored in the IIM's bookmark database. The process then continues to block 1565, and ends.

Figure 15C:
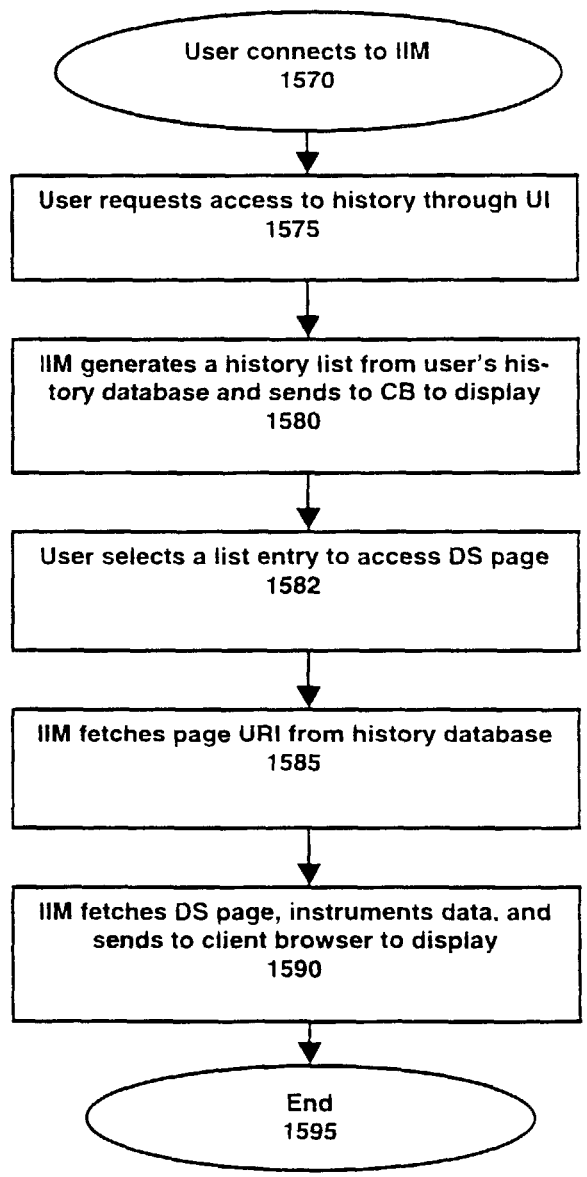
FIG. 15C is a flowchart of one embodiment of using the history functionality.

FIG. 15C is a flowchart of one embodiment of using the history functionality. At block 1570, the user connects to the IIM.

At block 1575, the user requests access to the history list through the IIM user interface. The history list includes the sites the user previously visited. For one embodiment, the history list is maintained for only a period of time, such as thirty days. For another embodiment, the history list is maintained indefinitely, and may be purged by the user.

At block 1580, the IIM generates a history list from the user's history database, and sends the history list to the client browser for display. For one embodiment, the history list is displayed in the destination server display area. For another embodiment, the history list is displayed in a separate window, or a separate frame At block 1582, the user selects a list entry to access the destination server page. At block 1585, the IIM fetches the page address from the history database. The page address is referenced through the IIM.

At block 1590, the IIM fetches the destination server page, instruments the communication, and sends the data to the client browser for display. At block 1595, the process ends. In this way, the IIM permits a user to access a variety of services through the IIM.

FIGS. 16A-C show sample alterations of references from the destination server by the IIM. FIGS. 16A-C illustrate changes to HTML, HTTP protocol, JavaScript, and Java. For one embodiment, this technique may be expanded to new languages and other types of interfaces. The data that is normally communicated directly between a Destination Server (DS) and client browser is altered by the IIM, as shown by FIGS. 16A-C. For one embodiment, some data may be transmitted directly between the DS and the client browser, without passing through the IIM.

For one embodiment, the IIM performs a subset of the message modifications required for redirection and downloads the client component to the client's browser, which performs the remaining subset of message modifications on the client machine. Together these two subsets of message modifications provide a complete solution for using an independent intermediary mechanism between a client and a server.

The modification of HTTP communication messages for redirection occurs on both the IIM and the client browser using the client component. The points at which the message modifications occur are called "HTTP control points".

FIGS. 16A-C illustrate examples of HTTP control points that occur on the client browser and the IIM. For HTTP message documents, description of modification code covers the three programming languages that are most widely used today for HTTP communication: HTML, JavaScript and Java. For another embodiment, the IIM utility may be broadened to include HTTP control points in other programming languages used for HTTP message documents. For one embodiment, the protocol modified in the messages is defined by the HTTP specification standard. One skilled in the art would understand how to expand the technique described to different programming languages or message protocols.

FIG. 17 is a table illustrating examples of making the IIM user interface frame persistent. The IIM prevents DS's from overwriting the user interface of the IIM. This permits the user to access the IIM regardless of what DS he or she is accessing.

FIG. 18 is a table illustrating examples of accessing cookies from the IIM. Generally, the destination server and destination server data on the client system access the cookie cache on the client's computer system. The IIM modifies the access mechanisms to access cookies from the IIMs cookie database.

FIG. 19 is a table illustrating examples of preserving top frame or IIM frame integrity for DS. Objects are often hung from the top frame of the client browser. The IIM changes the references to the top frame to create or access these objects to references to the top frame of DSDA. In this way, the objects are appropriately handled.

FIGS. 16-19 list some sample alterations resulting from the code instrumenting described above. Alternative methods of altering the code may be used. One skilled in the art knows how to implement different changes.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An intermediate device situated between a plurality of client devices and a plurality of destination servers, the intermediate device comprising:
a processor programmed to perform actions including:
facilitating a first message exchange between a client device associated with a user and a first destination server in the plurality of destination servers by forwarding through the intermediate device a first request from the client to the first destination server and forwarding through the intermediate device a corresponding response from the first destination server to the client;
intercepting and storing each cookie sent from the first destination server to the client such that, for each cookie sent from the first destination server to the client, the cookie is received by the intermediate device rather than the client;
receiving a second request from a different client device for a destination server resource, wherein the different client device is associated with the same user;
sending, to the first destination server, at least one cookie stored in the intermediate device;
determining at least one additional cookie that is located on the client device and copying it to the intermediate device, wherein the at least one additional cookie at the intermediate device simplifies access of the first destination server through the intermediate device;
facilitating the second request by sending, to the first destination server, transactional data received within application layer data within an association of the first request and the corresponding response of the first message exchange by the intermediate device and stored on the intermediate device during the facilitation of the first message exchange, and wherein the application layer data is intercepted as the application layer data is forwarded through the intermediate device and between the first destination server and the client device during the first message exchange between the first destination server and the client device, and the transactional data includes data other than authorization and authentication data; and
if the intermediate device is unable to process the second request because of a number of user connections, employing the intermediate device itself to redirect the second request to another intermediate device that is operative to process the second request in a same manner as the intermediate device, wherein a user's data is provided to the other intermediate device by the intermediate device to at least optimize a user's connection to the other intermediate device.

2. The intermediate device of claim 1, wherein the first request is sent to the first destination server and the second request is sent to a different destination server.

3. The intermediate device of claim 1, further comprising the actions of enabling the client device to log into the intermediate device before the client device is enabled to log into the first destination server.

4. The intermediate device of claim 1, further comprising the actions of:
providing access, via a user interface, to the transactional data stored on the intermediate device, wherein the user interface enables the user to modify at least a portion of the intercepted application layer data that is stored on the intermediate device.

5. The intermediate device of claim 1, further comprising the actions of:
providing access, via a user interface, to the transactional data stored on the intermediate device, wherein the user interface enables the user to modify at least a portion of the intercepted application layer data that is included in the second request to the destination server resource.

6. The intermediate device of claim 1, the actions further comprising:
providing access, via a user interface, to the transactional data stored on the intermediate device, wherein the user interface enables the user to review the association of the first request and the corresponding response.

7. The intermediate device of claim 1, wherein the association of the first request and the corresponding response is stored as a transaction record.

8. An intermediate device situated between a client and a plurality of destination servers, the intermediate device comprising:
a processor programmed to perform actions including:
facilitating, in a client session on the client associated with a requestor, a first message exchange between the client and a first destination server within the plurality of destination servers by forwarding through the intermediate device a first request from the client to the first destination server and forwarding through the intermediate device a corresponding response from the first destination server to the client;
intercepting and storing each cookie sent from the first destination server to the client such that, for each cookie sent from the first destination server to the client, the cookie is received by the intermediate device rather than the client;
receiving a second request from a different client device for a destination server resource, wherein the different client device is associated with the same user;
sending, to the first destination server, at least one cookie stored in the intermediate device;

determining at least one additional cookie that is located on the client device and copying it to the intermediate device, wherein the at least one additional cookie at the intermediate device simplifies access of the first destination server through the intermediate device;

facilitating the second request by sending, to the first destination server, transactional data received within application layer data within an association of the first request and the corresponding response of the first message exchange by the intermediate device and stored on the intermediate device during the facilitation of the first message exchange, and wherein the application layer data is intercepted as the application layer data is forwarded through the intermediate device and between the first destination server and the client device during the first message exchange between the first destination server and the client device, and the transactional data includes data other than authorization and authentication data; and if the intermediate device is unable to process the second request because of a number of user connections, employing the intermediate device itself to redirect the second request to another intermediate device that is operative to process the second request in a same manner as the intermediate device, wherein a requestor's data is provided to the other intermediate device by the intermediate device to at least optimize a requestor's connection to the other intermediate device.

9. The intermediate device of claim 8, wherein the first request is sent to the first destination server and the second request is sent to a different destination server within the plurality of destination servers.

10. An intermediate device situated between a plurality of client devices and a plurality of destination servers for use in managing a communication over a network, the intermediate device comprising:

a processor programmed to perform actions including:
receiving client messages, from a client device, by the intermediate device and forwarding the client messages to a first destination server within the plurality of destination servers;

intercepting and storing each cookie sent from the first destination server to the client device such that, for each cookie sent from the first destination server to the client device, the cookie is received by the intermediate device rather than the client device;

receiving server messages by the intermediate device and forwarding the server messages to the client device;

sending, to the first destination server, at least one cookie stored in the intermediate device;

determining at least one additional cookie that is located on the client device and copying it to the intermediate device, wherein the at least one additional cookie at the intermediate device simplifies access of the first destination server through the intermediate device;

means for intercepting and storing, at the intermediate device, application layer information that is in addition to URL data and that is intercepted as application layer data during a client session, wherein the application layer data is intercepted as the application layer data is forwarded through the intermediate device and between the first destination server and the client device during a message exchange between the first destination server and the client device, and wherein the application layer data is intercepted from at least one of the forwarded client messages and at least one of the forwarded server messages and stored as an association between the at least one of the forwarded client messages and the at least one of the forwarded server messages, and the application layer data includes data other than authorization and authentication data;

means for responding to a server request, from a different client device, for application layer information during another client session by sending, to the first destination server, the stored application layer information, wherein the different client device and the client device are associated with a same user; and if the intermediate device is unable to process a message because of a number of user connections, employing the intermediate device itself to redirect the message to another intermediate device that is operative to process the message in a same manner as the intermediate device, wherein a user's data is provided to the other intermediate device by the intermediate device to at least optimize a user's connection to the other intermediate device.

11. The intermediate device of claim 10, further comprising a server component, wherein the application layer information comprises user-accessible data that is accessible through the server component, and wherein the means for storing receives the user-accessible data from the server component and stores the user-accessible data.

12. The intermediate device of claim 10, wherein the application layer information comprises account information, and the means for storing receives the account information from the client device prior to receiving the server request for the application level information.

13. An intermediate device situated between a plurality of client computers and a plurality of destination servers, the intermediate device comprising:

a processor programmed to perform actions including:
facilitating, in a client session, a first message exchange that is between a client computer and a first destination server by forwarding through the intermediate device a first request from the client computer to the first destination server and forwarding through the intermediate device a corresponding response from the first destination server to the client computer;

intercepting application layer data that includes data other than bookmark data or authorization and authentication data by the intermediate device during the facilitation of the first message exchange;

storing the intercepted application layer data on the intermediate device, wherein the stored intercepted application layer data includes an association between the first request and the corresponding response;

intercepting and storing each cookie sent from the first destination server to the client computer such that, for each cookie sent from the first destination server to the client computer, the cookie is received by the intermediate device rather than the client computer;

receiving, in another client session on another client computer, a second request from the other client computer for a destination server resource, wherein the other client computer and the client computer are associated with a same user;

sending, to the first destination server, at least one cookie stored in the intermediate device;

determining at least one additional cookie that is located on the client device and copying it to the intermediate device, wherein the at least one additional cookie at the intermediate device simplifies access of the first destination server through the intermediate device;

facilitating the second request by sending to the first destination server, at least a portion of the intercepted application layer data that is more than bookmark data received during the facilitation of the first message exchange; and if the intermediate device is unable to process the second request because of a number of user connections, employing the intermediate device itself to redirect the second request to another intermediate device that is operative to process the second request in a same manner as the intermediate device, wherein a user's data is provided to the other intermediate device by the intermediate device to at least optimize a user's connection to the other intermediate device.

14. An intermediate device situated between a plurality of client devices and a plurality of destination servers, the intermediate device comprising:

a processor programmed to perform actions including:

facilitating a first message exchange between a client device in the plurality of client devices and a first destination server in the plurality of destination servers by forwarding through the intermediate device a first request from the client device to the first destination server and forwarding through the intermediate device a corresponding response from the first destination server to the client device;

intercepting transactional data by the intermediate device during the facilitation of the first message exchange, wherein the transactional data includes data received within the first request, including data submitted by a user of the client device, and the corresponding response of the first message exchange;

intercepting and storing each cookie sent from the first destination server to the client device such that, for each cookie sent from the first destination server to the client device, the cookie is received by the intermediate device rather than the client device;

storing the intercepted transactional data and other information from the first message exchange on the intermediate device, wherein the other information includes other data submitted by the user and data about the first message exchange;

sending, to the first destination server, at least one cookie stored in the intermediate device;

determining at least one additional cookie that is located on the client device and copying it to the intermediate device, wherein the at least one additional cookie at the intermediate device simplifies access of the first destination server through the intermediate device;

receiving a second request from a different client device for a destination server resource, wherein the different client device is associated with the user of the client device;

facilitating the second request by sending, to the first destination server, at least a portion of the stored transactional data received during the facilitation of the first message exchange; and if the intermediate device is unable to process the second request because of a number of user connections, employing the intermediate device itself to redirect the second request to another intermediate device that is operative to process the second request in a same manner as the intermediate device, wherein a user's data is provided to the other intermediate device by the intermediate device to at least optimize a user's connection to the other intermediate device.

15. The intermediate device of claim 14, wherein the first request is sent to the first destination server and the second request is sent to a different destination server.

16. The intermediate device of claim 14, further comprising the actions of:

providing access, via a user interface, to the transactional data and the other information stored on the intermediate device, wherein the user interface enables the user to modify at least a portion of the other information that is stored on the intermediate device.

* * * * *